United States Patent [19]
Horie et al.

[11] Patent Number: 5,835,472
[45] Date of Patent: *Nov. 10, 1998

[54] OPTICAL PICKUP DEVICE WITH SUBSTANTIALLY MUTUALLY ORTHOGONAL REFLECTION SURFACES

[75] Inventors: Noriyoshi Horie, Moriyama; Tatsuo Ohgaki, Takatsuki; Hayami Hosokawa, Yawata; Masami Tada, Takatsuki; Tsukasa Yamashita, Nara, all of Japan

[73] Assignee: Omron Corporation, Kyoto, Japan

[*] Notice: The terminal 39 months of this patent has been disclaimed.

[21] Appl. No.: 62,321

[22] Filed: May 17, 1993

Related U.S. Application Data

[62] Division of Ser. No. 736,741, Jul. 26, 1991, abandoned.

[30] Foreign Application Priority Data

| Jul. 31, 1990 | [JP] | Japan | 2-201450 |
| Jul. 31, 1990 | [JP] | Japan | 2-204367 |
| Sep. 21, 1990 | [JP] | Japan | 2-250079 |
| Mar. 15, 1991 | [JP] | Japan | 3-074195 |
| Mar. 15, 1991 | [JP] | Japan | 3-074196 |

[51] Int. Cl.$^6$ .................................................. G11B 7/00
[52] U.S. Cl. ...................... 369/110; 369/44.23; 369/112
[58] Field of Search .................................. 369/13, 44.23, 369/44.41–44.42, 54, 58, 110–112, 120, 124; 359/583, 495, 629, 834, 837

[56] References Cited

U.S. PATENT DOCUMENTS

| 4,926,403 | 5/1990 | Tsuyuguchi et al. ...................... 369/13 |
| 4,951,274 | 8/1990 | Iwanaga et al. ...................... 369/44.11 |

(List continued on next page.)

FOREIGN PATENT DOCUMENTS

| 174008 | 3/1986 | European Pat. Off. . |
| 0 280 208 | 8/1988 | European Pat. Off. . |

Primary Examiner—W. R. Young
Attorney, Agent, or Firm—Dickstein Shapiro Morin & Oshinsky LLP

[57] ABSTRACT

An integrated optical pickup device for a magnetooptical recording medium (e.g. a magnetooptical recording disk) and/or an optical recording medium (e.g. an optical recording disk) in which a plurality of focusing grating couplers are formed on an optical waveguide layer manufactured on a substrate. A light reflected from a magnetooptical disk or an optical disk is guided by the focusing grating couplers into the waveguide layer to be separated and to be converged therethtough. The converged lights are detected so as to produce a tracking error signal, a focusing error signal, and an information readout signal. The plural focusing grating couplers are fabricated at an identical location on the waveguide in a superimposed fashion. This increases the utilization efficiency of reflection light per each unitary area of the focusing grating couplers and hence the signals are obtained in a stable state.

Between a semiconductor laser and a collimation lens, there is formed a composite beam splitter having two reflection surfaces. Reflection lights from the magnetooptical disk are respectively reflected by these reflection surfaces and are then received by photosensors. Analyzers are disposed respectively on front sides of the photosensors. The analyzers respectively have polarization directions orthogonal to each other. Each photosensor includes three-partition photodiode. The beam sizing method and the push-pull detection methods are used for detecting the focusing and tracking errors.

The optical pickup device can also used to read data from an optical disk.

A prism is disposed between a semiconductor laser and a collimation lens. The prism has two reflection surfaces. Reflection lights from a magnetooptical disk are respectively reflected by these reflection surfaces to be received by photosensors. On front sides of the photosensors, there are respectively arranged analyzers respectively having polarization directions orthogonal to each other.

10 Claims, 28 Drawing Sheets

U.S. PATENT DOCUMENTS

| | | | |
|---|---|---|---|
| 4,953,124 | 8/1990 | Koyama | 369/110 X |
| 4,984,901 | 1/1991 | Maury | 369/13 |
| 5,070,493 | 12/1991 | Marshall et al. | 369/44.23 X |
| 5,105,399 | 4/1992 | Shimonou | 369/13 |
| 5,105,415 | 4/1992 | Tayefeh | 369/110 |
| 5,132,959 | 7/1992 | Ishika | 369/44.23 X |
| 5,218,852 | 6/1993 | Marchant | 369/13 X |

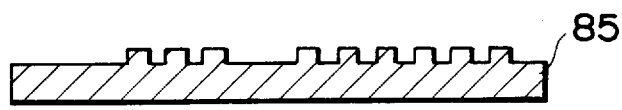
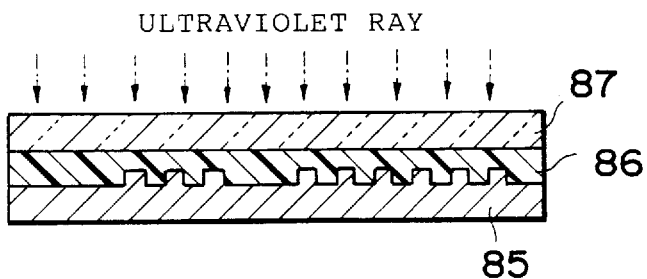
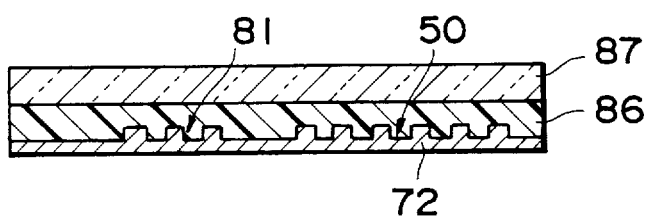
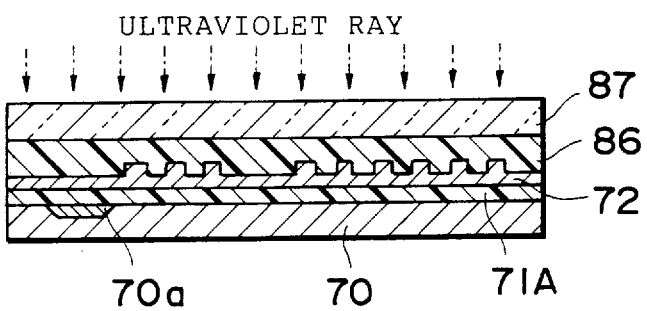
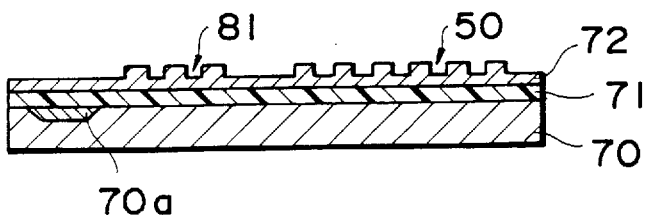

ULTRAVIOLET RAY

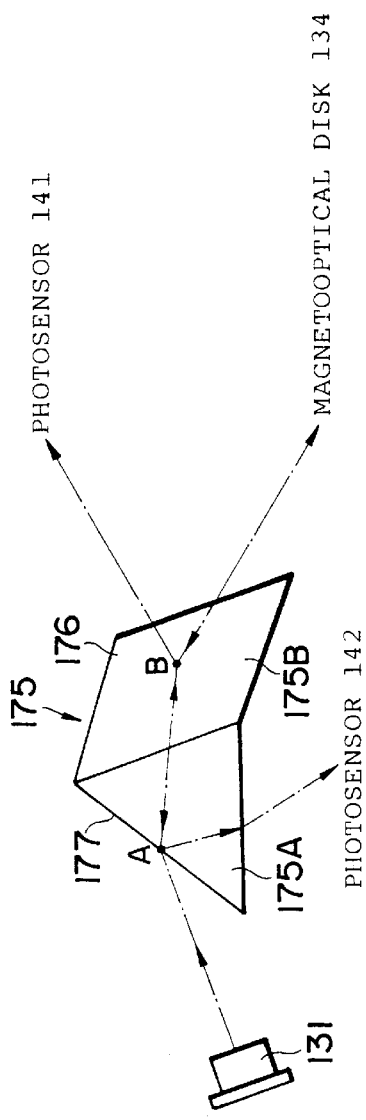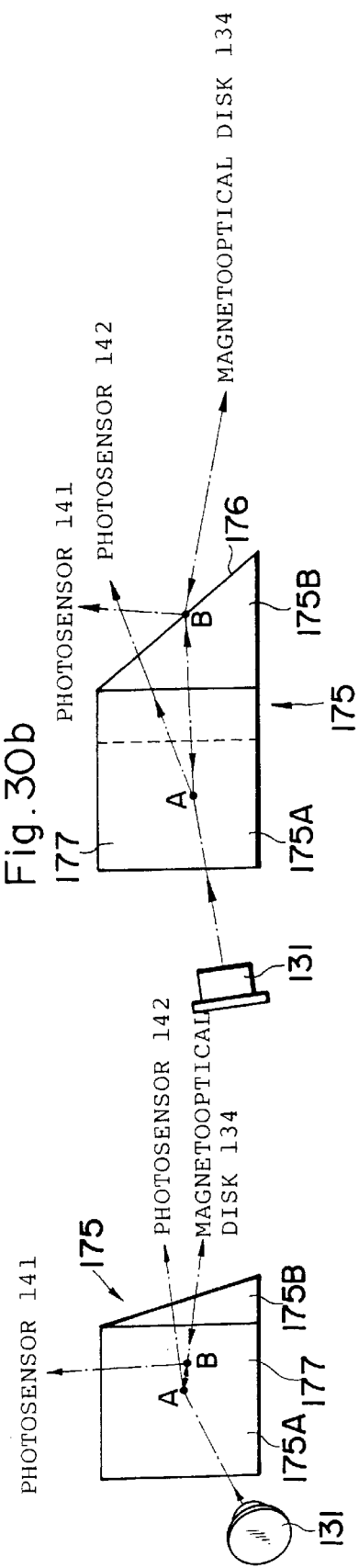

OPTICAL PICKUP DEVICE WITH SUBSTANTIALLY MUTUALLY ORTHOGONAL REFLECTION SURFACES

This application is a division, of application Ser. No. 07/736,741 filed Jul. 26, 1991, now abandoned.

BACKGROUND OF THE INVENTION

1. Field of the Invention

The present invention relates to an optical pickup device for reading data recorded on an optical recording medium.

In the present invention, the optical recording medium includes in addition to an optical recording medium such as an optical disk or an optical card, a magnetooptical recording medium such as a magnetooptical disk or a magnetooptical card.

Moreover, the optical pickup device according to the present invention may naturally be used not only to read data from the optical recording medium but also to write data thereon.

2. Description of Related Art

In the prior art, an optical pickup device includes constituent elements such as a first optical system for collimating lights irradiated from a semiconductor laser, a second optical system for focusing the collimated lights onto an optical recording medium and for collimating lights reflected from the optical recording medium, a first polarization beam splitter for separating through polarization the reflection lights thus collimated by the second optical system, a second polarization beam splitter for separating the light from the first polarization beam splitter into a tracking control light and a focusing control light, a third optical system for focusing the separated tracking control light onto a light receiving surface of a tracking control photosensor, a fourth optical system for focusing the separated focusing control light onto a light receiving surface of a focusing control photosensor, and a fifth optical system disposed in the third or fourth optical system for guiding a light to a photosensor producing a readout signal.

The conventional optical pickup device of this type is ordinarily constituted with a large number of optical parts and hence is heavy, which leads to a problem of a slow access time. In addition, due to the large number of optical parts, the cost thereof is increased and assemblage and adjustment of these parts take a great amount of human labor and a long period of time, which also leads to a problem that the cost of the final product is increased.

In order to solve the problems above, there have been intensively achieved research and study to implement a compact and light-weight optical pickup for a magnetooptical disk based on the optical integration technology. For example, according to an optical pickup device described in an article "Waveguide-Type Differential Detection Device for Magnetooptical Disk Pickup", Sunagawa et al., Institute of Electronics, Information, and Communication Engineers of Japan, Quantum Electronics Study Group 0QE86-177, a plurality of focusing grating couplers respectively exciting lights in the transverse magnetic (TM) and transverse electric (TE) modes are formed on a waveguide layer manufactured on a substrate. A light reflected from a magnetooptical disk is guided by the focusing grating couplers in to the waveguide layer; moreover, the light is separated to be converged depending on the modes. The resultant reflection lights are sensed so as to produce a tracking error signal, a focusing error signal, and an information readout signal.

FIG. 32 shows the focusing grating couplers described in the article above. In the configuration, three focusing grating couplers 191, 192, and 193 are fabricated side by side on a waveguide layer formed on a substrate 190. The reflection light from the magnetooptical disk is irradiated onto the focusing grating couplers 191 to 193 from a position thereabove with a right incident angle or an oblique incident angle. These focusing grating couplers are manfactured such that the coupler 191 has a grating period slightly larger than those of the couplers 192 and 193 so as to excite a light in the TM mode and the couplers 192 and 193 excite a light in the TE mode. The light reflected from the magnetooptical disk is represented as a composite vector including a P component (Ep) and an S component (Es) of the electric field. The Ep component of the reflection light satisfies the phase matching condition in the focusing grating coupler 191, which leads to an excitation of the TM mode light. On the other hand, for the Es component thereof, the phase matching condition holds in the focusing grating couplers 192 and 193, which hence cause an excitation of the TE mode light. For the Ep component, a light coupling rarely takes place in the grating couplers 192 and 193; whereas, for the Es component, the optical coupling hardly occurs in the coupler 191. With this provision, the Ep and Es components of the light reflected from the magnetooptical disk are separated through the coupler 191 and the couplers 192 and 193, respectively so as to be focused on the respective focal points (on a waveguide layer or on an end surface of the substrate 190). Each focused light is received by a photosensor associated therewith. Based on signals produced from the photosensors related to the lights, the system creates a readout signal, a focusing error signal, and a tracking error signal.

In the focusing grating couplers above, the two kinds of waveguide modes, namely, the TM and TE modes are excited only in the respective separated regions. More specifically, the lights in the TM and TE modes are excited only in the region of the coupler 191 and in the area of the couplers 192 and 193, respectively. This leads to a problem of deterioration of the light utilization efficiency. Although the lights reflected from the magnetooptical disk are illuminated onto the entire region of the focusing grating couplers 191 to 193, the optical coupling of the lights with the waveguide layer takes place only in some portions of the region. Consequently the quantity of the reflection lights incident to the photosensors is decreased and hence it is difficult to detect various kinds of signals in a stable condition.

Furthermore, due to a variation in the wavelength of lights illuminated from the light source, an increase or a decrease in the size of each grating with respect to a change in the temperature, or the like, a light in other than the TM mode may be excited by the focusing grating coupler 191 and/or the light excitation may take place for a light other than the TE mode in the couplers 192 and 193. As a result, the system cannot satisfactorily accomplish the mode separation and hence there arises a problem that the various types of signals cannot be sensed with a satisfactorily high precision.

In this regard, t here has been also proposed a compact light-weight pickup device for an optical disk similarly employing the optical integration technology. Such a pickup device has been described, for example, in an article "An Integrated-Optic Disk Pickup Device", S. Ura et al., Institute of Electronics, Information, and Communication Engineers of Japan, Quantum Electronics Study Group 0QE85-72. FIG. 33 shows a portion of the optical pickup device. In this structure, on an $SiO_2$ buffer layer 201 manufactured on a silicon substrate 200, a waveguide layer 202 is formed with a glass material. On the waveguide layer 202, a focusing grating coupler 203 and a waveguide beam splitter (grating) 204 are manufactured in a chirped structure by use of a patterning technology based on an electron beam lithography and a reactive ion etching technology. In operation, a laser diode 205 disposed on an end surface of the substrate 200 emits a light, which propagates through the waveguide layer 202 to be irradiated to an upward direction by the focusing grating coupler 203 so as to be focused onto a surface of an optical disk 209. A light reflected from the surface of the optical disk 209 is passed via the focusing grating coupler 203 to be optcally coupled with the waveguide 202 and is then separated by the waveguide beam splitter 204 into two portions, which are respectively converged therethrough to be received by respective partitions of a two-partition photoelectric converter element 206. Based on signals created from the photoelectric converter 206, there are generated a readout signal, a focusing error signal, and a tracking signal. In this constitution, the waveguide beam splitter 204 develops three functions including a separation of a wave surface or wavefront, deflection of an incident light, and focusing or converging the light. Through the operation above, the system reads information recorded in the form of a pit string on a surface of the optical disk 209.

In the optical pickup device of this kind, the light radiated from the laser diode 205 passes twice through the waveguide beam splitter 204 and the focusing grating coupler 203 before the light is received by the photoelectric converter 206, namely, the light passes these units each time the light proceeds in a direction from the laser diode 205 to the optical disk 209 and in a direction from the disk 209 to the photoelectric conversion element 206. Consequently, the light passes a grating structure four times before the light is sensed. Namely, the light received by the photoelectric converter 206 becomes to be considerably weak and hence a signal produced therefrom has a minimized intensity. Moreover, due to an alteration in the waveform of the light emitted from the laser diode as the light source and a deviation in the period or cycle of each grating caused by a change in the temperature or the like, there particularly occurs a fluctuation in a focusing position of the light incident to the photoelectric conversion element 206. As a result, there arises a problem that various kinds of signals cannot be sensed in a stable state.

SUMMARY OF THE INVENTION

It is therefore an object of the present invention to provide an optical pickup device of the type above in which a tracking error signal, a focusing error signal, and an information read out signal are obtained with a high stability and an increased accuracy.

Another object of the present invention is to provide an optical pickup device which has a reduced size and a lower weight and which is suitable for mass production.

In accordance with the present invention, there is provided an optical pickup device for a magnetooptical recording medium comprising a light source and a light projecting optical system for emitting a linearly polarized light onto a surface of a magnetooptical recoding medium, a waveguide substrate in which a plurality of focusing grating couplers respectively exciting lights in the TM and TE modes are formed on an optical waveguide, a light receiving optical system for delivering a reflection light from the magnetooptical recording medium to the focusing grating couplers on the waveguide substrate, a plurality of photoelectric conversion elements for sensing lights respetively focused by the focusing grating couplers, and signal process means for producing based on signals outputted from the photoelectric conversion elements a tracking error signal, a focusing error signal, and an information readout signal, wherein the plural focusing grating couplers are arranged in a superimposed manner at an identical position on the optical waveguide formed on the wave guide substrate.

According to the present invention, since the plural focusing grating couplers respectively exciting the lights in the TM and TE modes are fabricated in a superimposed manner at an identical position on the optical waveguide formed on the waveguide substrate, the overall area where the focusing grating couplers are manufactured is adopted to couple the TM and TE mode lights with the optical wveguide, thereby improving the light utilization efficiency for each unitary area. As a result, an increased portion of the reflection light from the magnetooptical recording medium is delivered to the photoelectric conversion elements so as to process the signals in a stable state.

It is favorable to dispose, on a front side of the light receiving surface of each of the photoelectric conversion elements, a polarizing plate which passes therethrough a light having a direction of plarization inherent to a light coupling with an associated one of the focusing grating couplers.

With the provision above, even when the focusing grating coupler excites a light in a mode other than an objective mode and lights in a plurality of modes are received, only the light of the objective mode is passed through the polarizing plate to enter the photoelectric conversion element, thereby attaining the detection signals in a stable condition and with a high precision.

Moreover, at least a portion of the light projecting optical system and the light receiving optical system may be shared such that the light source is disposed at a position opposite to the magnetooptical recording medium with the waveguide substrate disposed therebetween and the substrate favorably includes a transparent portion developing a light polarizing and separating function to pass therethrough only a component of the light from the light source, the light component having a particular polarization direction.

Thanks to the arrangement above, the optical systems can be configured in a compact size; moreover, depending on the placement of the waveguide substrate, the polarization direction of the light produced from the light source can be controlled. This is particularly effective when the positioning precision of the waveguide substrate is higher than that of the light source.

In addition, an optical pickup device for an optical recording medium according to the present invention includes a light source for generating a light beam to be emitted onto a surface of an optical recording medium, a plurality of photoelectric conversion elements for sensing reflection lights from the surface of the optical recording medium, a waveguide substrate having an optical waveguide on which are formed a light projection focusing grating coupler for directly emitting lights from the light source onto the surface of the optical recording medium and/or for irradiating the lights via a light projection optical system thereonto and a light reception focusing grating coupler for directly receiving reflection lights from the optical recording medium and/or for receiving the lights via a light reception optical system to converge the lights onto the photoelectric conversion elements, and signal process means for generating, based on signals outputted from the photoelectric conversion elements, a tracking error signal, a focusing error signal, and an information readout signal, wherein the light projection and reception focusing grating couplers are formed in a superimposed manner at an identical position of the waveguide manufactured on the waveguide substrate.

In accordance with the present invention, since the light projection and reception focusing grating couplers are formed at an identical position on the waveguide substrate in a superimposed manner, the lights pass the composite grating coupler only twice before the lights are received by the photoelectric conversion elements. Consequently, attenuation of the lights is favorably mitigated so as to enable the various signals to be detected in a stable condition.

Favorably, the waveguide substrate is made of a semiconductor material, the plural photoelectric converter elements are integrally formed on the substrate, and optical couplers are disposed in the waveguide to couple the reflection lights propagating therethrough with the photoelectric conversion elements. As a result, the integration degree of the pickup device is increased.

The optical pickup device according to the present invention comprises a substrate on which an optical waveguide is formed, a lens function element an grating couplers respectively manufactured at an identical position of the substrate in a superimposed manner, a light source producing a light for use in a recording operation and/or a reproducing operation, a light projection optical system including the lens function element for focusing and for projecting the light from the light source onto a surface of the optical recording medium, a light reception optical system including the grating couplers for optically coupling a reflection light from the optical recording medium with the optical waveguide on the substrate, and a plurality of photoelectric conversion elements for sensing lights coupled with the waveguide on the substrate.

In a mode of carrying out the present invention, the light source and the light projection optical system are arranged on an optical axis of the lens function element.

In another mode of carrying out the present invention, the optical axis of the lens function element is inclined relative to a principal plane of the substrate.

In further another mode of carrying out the present invention, the substrate is transparent and the light source is disposed at a position opposite to the optical recording medium with the substrate enclosed therebetween.

In still another mode of carrying out the present invention, the lens function element is of a reflection type, and the the light source and optical recording medium are arranged at positions on an identical side of the substrate.

The lens function element and the grating couplers are favorably formed to be integral with the optical waveguide.

In accordance with the present invention, a light transmitted from a light source is converged by a light projection optical system including the lens function element to be projected on a recording surface of an optical recording medium. On the other hand, a reflection light thus attained from the recording surface is optically coupled with an optical waveguide by the grating couplers. The light propagates through the optical waveguide to be sensed by a photoelectric conversion element.

In this configuration, the lens function element is adopted to converge and to project the light onto the recording surface of the optical recording medium. The optical transmission efficiency or the light reflection efficiency and the diffraction efficiency of the lens function element are respectively higher than those of the focusing grating coupler. This consequently minimizes deterioration in the power of the emitted light and hence the light can be naturally used to read data from the disk as well as to write data thereon.

In addition, the usage of the lens function element unnecessitates the coupling of the waveguide with the light emitting element as the light source, which mitigates the high precision requirement in the manufacturing process. As a result, it is possible to fabricate a low-priced optical pickup device having a relatively stable characteristic with respect to a temperature change and vibrations.

Furthermore, when the pickup device is configured such that the lights emitted from the lens function element are not directly projected onto the recording surface of the optical recording medium i.e. the lights are once focused by an objective to be projected onto the recording surface and the objective position is adjustable, the focusing position of the lights (the position of the pickup device over the recording surface) can be altered only by moving the objective with the substrate position kept unchanged (in the focusing and tracking control operations). In consequence, the weight of the portion of the device to be moved for the focal adjustment is minimized and hence the pickup positioning speed is increased or the access time is decreased; moreover, due to the reduced weight of the moving portion, there is developed a stable movement of the pickup device.

Moreover, the optical waveguide, lens function elements, and grating couplers can be formed in an integrated manner and hence are quite suitable for mass production, which enables the pickup device to be fabricated at a low cost.

The optical pickup device for an optical recording medium including an optical disk or an optical card in accordance with the present invention comprises a light emitting element and a focusing optical system for converging a light irradiated from the light emitting element onto the optical recording medium and for focusing a reflection light from the optical recording medium, wherein the device is characterized by including a composite beam splitter having two reflection surfaces for passing therethrough at least a portion of the light emitted from the light emitting element and for reflecting a portion of the reflection light from the optical recording medium into two different directions and two photosensors for respectively receiving two light beams reflected from the composite beam splitter.

In the constitution above, the two reflection surfaces of the composite beam splitter may be arranged to be substantially orthogonal to each other; alternatively, the reflection surfaces may be disposed to be substantially parallel to each other and to be separated from each other by a predetermined distance along an axial direction of the focusing optical system.

The optical pickup device for a magnetooptical recording medium such as a magnetooptical disk or a magnetooptical card in accordance with the present invention is characterized in that on a front side of a light receiving surface of the photosensor, there are disposed two analyzers respectively having polarization directions which are orthogonal to each other.

An alternative optical pickup device for a magnetooptical recording medium in accordance with the present invention comprises a light emitting element and a focusing optical system for converging a light irradiated from the light emitting element onto the magnetooptical recording medium and for focusing a reflection light from the magnetooptical recording medium. The optical pickup device is characterized by including a composite polarization beam splitter having two polarization reflection surfaces for passing therethrough at least a portion of the light emitted from the light emitting element and for separating a portion of the reflect ion light from the magnetooptical recording medium into two polarized components respectively having polarization directions which are orthogonal to each other and for reflecting into two different directions and two photosensors for respectively receiving two polarized light components thus separated by the composite polarization beam splitter.

In a preferable configuration of the optical pickup device, the two polarization reflection surfaces of the composite polarization beam splitter are orthogonal to each other.

In the optical pickup device for an optical recording medium or a magnetooptical recording medium in accordance with the present invention, the composite beam splitter or the composite polarization beam splitter is disposed between the light emitting element and the focusing optical system. Alternatively, when the focusing optical system is configured to include a collimation lens and an objective, the collimation lens is desirably disposed between the objective and the composite beam splitter or between the objective and the composite polarization beam splitter.

In the optical pickup device for an optical recording medium, the light emitted from the light emitting element is focused by the focusing optical system onto the optical recording medium. A reflection light from the optical recording medium is converged by the focusing optical system such that a portion of the converged light is reflected into two directions by the composite beam splitter to be received by the two photosensors, respectively. Using signals created from the two photosensors, the pickup device generates a tracking err or signal and a focusing error signal. Moreover, based on a signal from either one of the photosensors or on signals outputted from both thereof, the device produces a data readout signal.

In the optical pickup device for a magnetooptical recording medium, the light emitted from the light emitting element is focused by the focusing optical system onto an magnetooptical recording medium. A light thus reflected from the magnetooptical recording medium is converged by the focusing optical system such that a portion of the converged light is reflected into two directions by the composite beam splitter to be received by the two photosensors through analyzers, respectively. Utilizing signals from the two photosensors, the pickup device creates a tracking error signal and a focusing error signal. Since the two analyzers respectively having the polarization directions orthogonal to each other are disposed on the front side of the two photosensors, depending on a difference between signals respectively outputted from these two photosensors, the pickup device detects a rotation angle of a plane of polarization of a reflection light associated with data recorded on the magnetooptical recording medium. Based on the rotation angle signal thus detected, the system reproduces the data recorded on the disk.

In an alternative optical pickup device for a magnetooptical recording medium, the light emitted from the light emitting element is converged by the focusing optical system onto a magnetooptical recording medium. A light thus reflected from the magnetooptical recording medium is focused by the focusing optical system such that a portion of the converged light is separated into two polarized components having two polarization directions orthogonal to each other by the composite polarization beam splitter so as to be received by the two photosensors, respectively. Using signals generated from the two photosensors, the pickup device creates a tracking error signal and a focusing error signal. Depending on a difference between signals respectively outputted from these two photosensors, the pickup device detects a rotation angle of a plane of polarization of a reflection light associated with data recorded on the magnetooptical recording medium. Based on the rotation angle signal thus obtained, the pickup device resultantly reproduce s the data stored on the disk.

As described above, in accordance with the present invention, an optical pickup device can be constituted with a light emitting element, a focusing optical system, a composite beam splitter or a composite polarization beam splitter, and two photosensors. As a result, the number of positions to be adjusted in the optical pickup device, for example, for an optical axis alignment is reduced. In consequence, when manufacturing the pickup devices, the efficiency of mass production is remarkably increased. In addition, the size and weight of the optical pickup device are also minimized, thereby achieving the object of the present invention with respect to the optical recording medium, namely, the track access time is decreased.

The optical pickup device for an optical recording medium such as an optical disk or an optical card according to the present invention comprises a light emitter element and a focusing optical system for converging a light emitted from the light emitter element onto the optical recording medium and for focusing a reflection light from the optical recording medium, wherein the device is characterized by including a prism having two reflection surfaces for passing therethrough the light emitted from the light emitter element and for reflecting a portion of the reflection light from the optical recording medium into two different directions and two photosensors for respectively receiving two light beams reflected from the prism.

In this constitution, in order for each of the two photosensors to receive from the prism substantially an identical amount of reflection light, each of the reflection surfaces of the prism is favorably coated with a reflection film.

The optical pickup device for a magnetooptical recording medium such as a magnetooptical disk or a magnetooptical card in accordance with the present invention is characterized in that on a front side of a light receiving surface of each of the photosensors, there is disposed an analyzer. These analyzers respectively have polarization directions which are orthogonal to each other.

An alternative optical pickup device for a magnetooptical recording medium according to the present invention comprises a light emitting element and a focusing optical system for converging a light irradiated from the light emitting element onto the optical recording medium and for focusing a reflection light from the optical recording medium. The optical pickup device is characterized by including a prism having two polarization reflection surfaces for passing therethrough the light emitted from the light emitting element and for separating the reflection light from the optical recording medium into polarized components respectively having polarization directions orthogonal to each other, thereby reflecting the polarized light components into two different directions and two photosensors for respectively receiving two polarized light components thus separated by the prism.

Preferably, in the configuration of the optical pickup device, the two polarization reflection surfaces of the prism are orthogonal to each other.

In the optical pickup device for an optical recording medium or a magnetooptical recording medium in accordance with the present invention, the prism is disposed between the light emitting element and the focusing optical system. Alternatively, when the focusing optical system is configured to include a collimation lens and an objective, the collimation lens is desirably located between the objective and the prism.

In the optical pickup device for an optical recording medium, the light illuminated from the light emitting element is focused by the focusing optical system onto the optical recording medium. A reflection light from the optical recording medium is converged by the focusing optical system such that a portion of the converged light is reflected into two directions by the prism to be received by the two photosensors, respectively. Using signals created from the two photosensors, the pickup device generates a tracking error signal and a focusing error signal. Moreover, based on a signal from either one of the photosensors or on signals outputted respectively from the two photosensors, the pickup device produces a data readout signal.

In the optical pickup device for a magnetooptical recording medium, the light emitted from the light emitting element is focused by the focusing optical system onto a magnetooptical recording medium. A light thus reflected from the magnetooptical recording medium is converged by the focusing optical system such that a portion of the converged light is reflected into two directions by the prism and is then received by the two photosensors via the two agnalyzers, respectively. Utilizing signals from the two photosensors, the pickup device creates a tracking error signal and a focusing error signal. Since the two analyzers respectively having the polarization directions orthogonal to each other are resepctively disposed on the front sides of the two photosensors, depending on a difference between signals respectively outputted from these two photosensors, the pickup device detects a rotation angle of a plane of polarization of a reflection light associated with data recorded on the magnetooptical recording medium. Based on the rotation angle signal thus detected, the system reproduces the data recorded on the disk.

In an alternative optical pickup device for a magnetooptical recording medium, the light emitted from the light emitting element is converged by the focusing optical system onto a magnetooptical recording medium. A light thus reflected from the magnetooptical recording medium is focused by the focusing optical system such that a portion of the converged light is separated into two polarized components having two polarization directions orthogonal to each other by the prism to be then reflected into two different directions so as to be received by the two photosensors, respectively. Using signals generated from the two photosensors, the pickup device creates a tracking error signal and a focusing error signal. Furthermore, depending on a difference between signals respectively outputted from these two photosensors, the pickup device detects a rotation angle of a plane of polarization of a reflection light associated with data recorded on the magnetooptical recording medium. Based on the rotation angle signal thus obtained, the system reproduces the data recorded on the medium.

As above, according to the present invention, an optical pickup device can be constituted with a light emitting element, a focusing optical system, a prism, and two photosensors. Resultantly, the number of positions to be adjusted in the optical pickup device, for example, for an optical axis alignment is minimized. In consequence, when fabricating the pickup devices, the efficiency of mass production is considerably improved. In addition, the optical pickup device is also minimized in its size and weight. As a result, there is achieved the object of the present invention with respect to the optical recording medium, namely, the track access time of the pickup device is reduced.

The foregoing and other objects, advantages, manner of operation and novel features of the present invention will be understood from the following detailed description when read in connection with the accompanying drawings.

BRIEF DESCRIPTION OF THE DRAWINGS

FIGS. 17a to 17f are cross-sectional views showing a manufacturing process of the waveguide substrate of FIG. 14 or 15;

FIGS. 30a, 30b, and 30c are a plan view, a front view, and a side view of a prism utilized in the optical head of FIG. 29;

DESCRIPTION OF THE PREFERRED EMBODIMENTS

Figure 1:
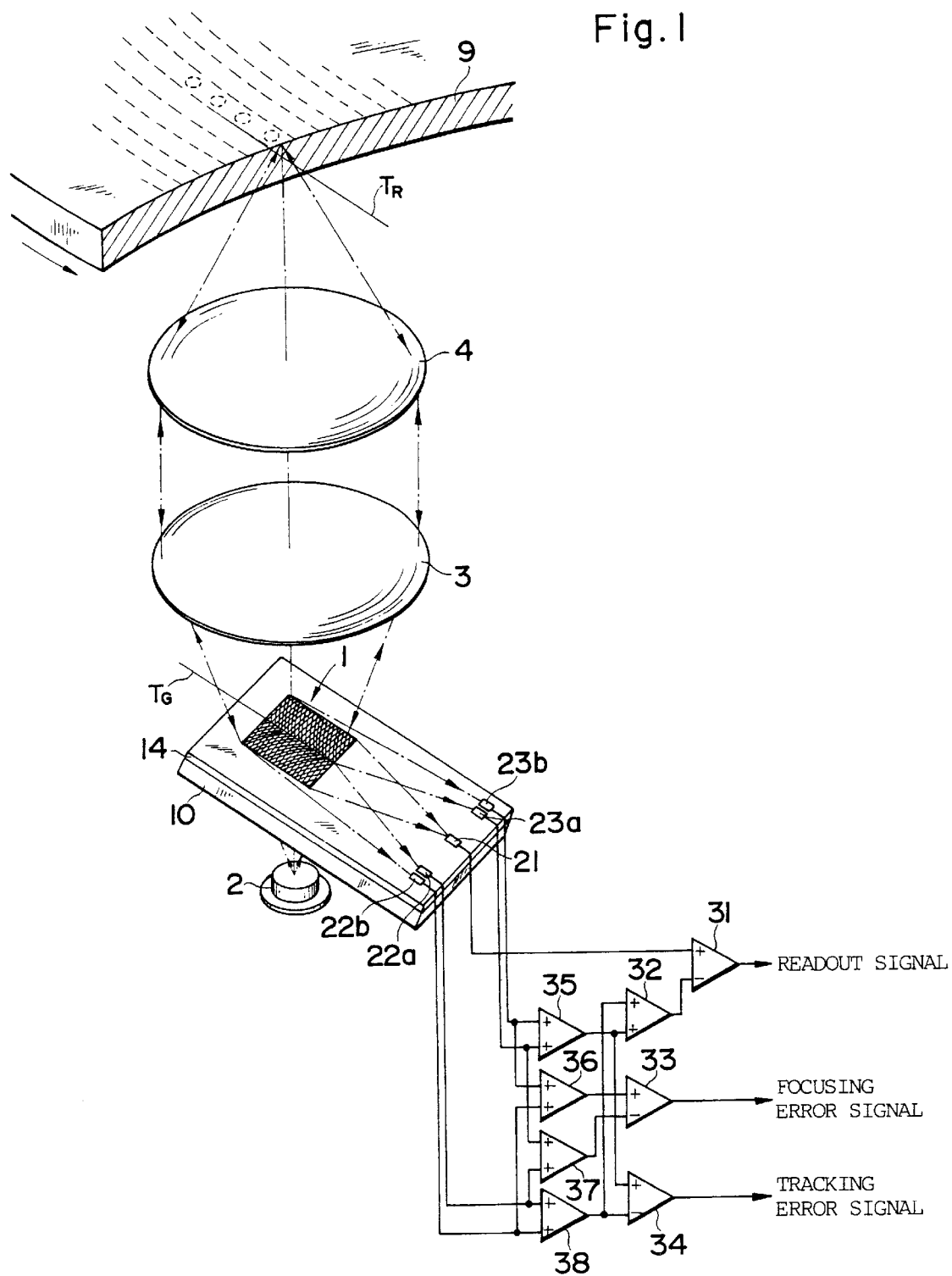
FIG. 1 is a perspective view illustratively showing an optical system of an optical pickup device in a first embodiment according to the present invention.

FIG. 1 shows a first embodiment of an optical pickup device in accordance with the present invention. This optical pickup device has a configuration suitable for a read operation to acquire information stored on a magnetooptical disk.

The optical pickup device includes a semiconductor laser 2 as a light source, a substrate 10 on which a composite focusing grating coupler 1 is fabricated, a collimation lens 3, and an objective 4. These optical system elements are arranged in a tracking and focusing actuator (not shown).

Figure 3:
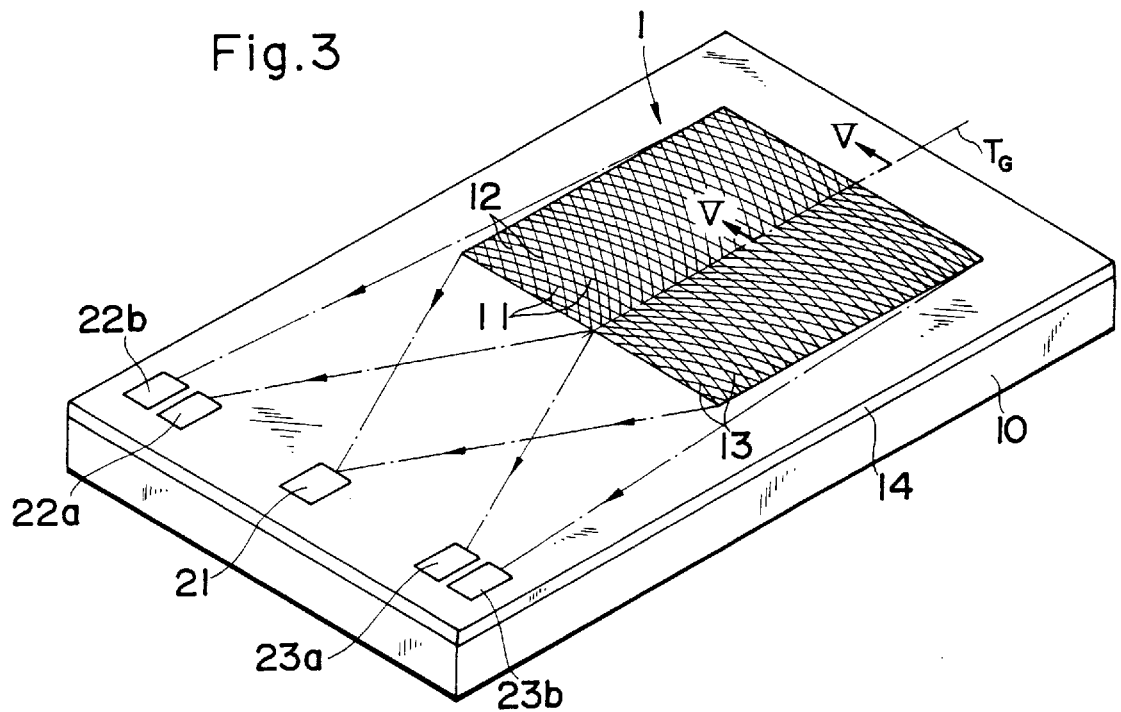
FIG. 3 is an overall perspective view showing the structure of an optical system including a waveguide substrate and a composite focusing grating coupler manufactured thereon.
Figure 5:
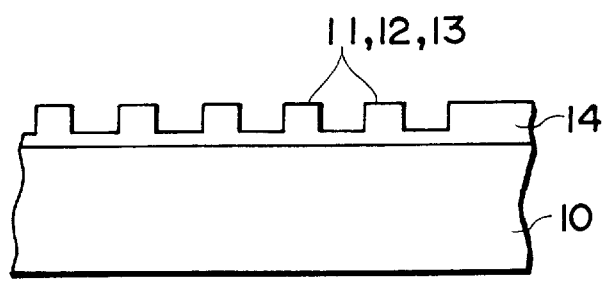
FIG. 5 is a magnified cross-sectional view taken along a line V—V of FIG. 3.
Figure 4:
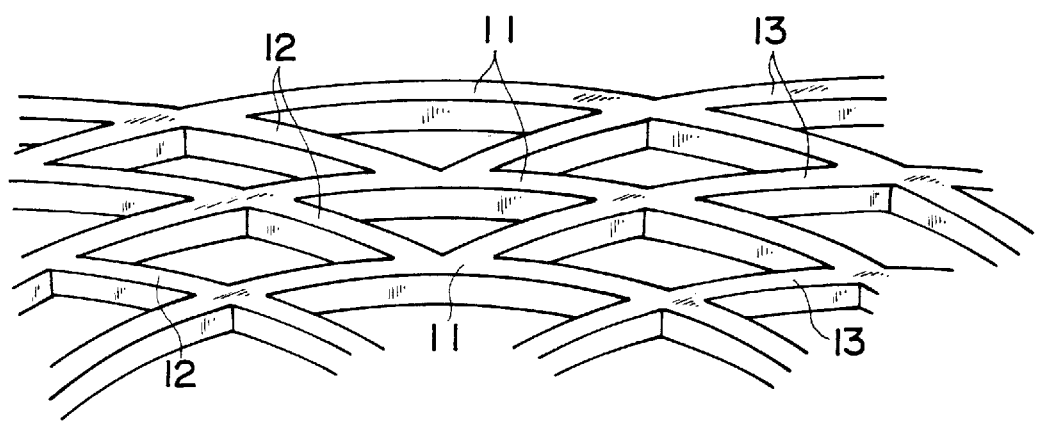
FIG. 4 is a magnified perspective view showing a portion of the configuration of FIG. 3.

FIGS. 3 to 5 show details about the composite focusing grating coupler 1 manufactured on the substrate 10. FIG. 3 is a perspective view showing the overall constitution of the substrate 10 on which the coupler 1 is formed wherein each grating is indicated with a line having neither a thickness nor a width, FIG. 4 is a magnified view showing each grating in detail, and FIG. 5 is a magnified cross-sectional view taken along a line V—V of FIG. 3.

On the substrate 10, an optical waveguide layer 14 is formed and then two kinds of gratings i.e. a grating 11 and gratings 12 and 13 are manufactured on the waveguide layer 14 in an overlapped manner at a predetermined position of the layer 14. The grating 11 is fabricated over the entire region to serve as a focusing grating coupler and has a period for exciting in the TM mode a light having a wavelength equal to that of the light emitted from the semiconductor laser 2. Of a light which is reflected from a magnetooptical disk 9 and which is incident to this region from a position thereabove with a right incident angle or an oblique incident angle, an Ep component is optically coupled with the grating 11 to propagate through the waveguide layer 14 so as to be focused onto a position of an end portion of the substrate 10. The gratings 12 and 13 are respectively formed in a right-half portion and a left-half portion of the region (a boundary line and a prolonged line thereof are denoted with $T_G$) so as to function as grating couplers respectively having different focusing positions. These couplers respectively have periods exciting TE mode lights. Of the reflection light entering the region, an Es component is optically coupled with the gratings 12 and 13 and then the light propagates through the waveguide layer 14 to be focused onto respective focusing positions on the both side of the focusing portion of the focusing grating coupler 11. That the coupler 11 is superimposed onto the couplers 12 and 13 specifically means, as shown in FIG. 4, that projected band or stripe portions of these gratings intersect with each other in an identical plane.

In addition, on the waveguide layer 14 of the substrate 10, a photoelectric converting element 21 is disposed substantially at the focusing position of the light coupled with the focusing grating coupler 11; moreover, two-partition photoelectric conversion elements respectively including partitions 22a and 22b as well as 23b and 23b are arranged substantially at the focusing positions of the lights coupled with the focusing grating couplers 12 and 13, respectively.

Returning to FIG. 1, the semiconductor laser 2 is favorably disposed in the configuration such that the light (linearly polarized light) emitted from the semiconductor laser 2 has a plane of polarization inclined by 45° with respect to a direction of a tangent line (denoted by $T_R$) of a track prepared on the magnetooptical disk 9. Furthermore, the substrate 10 is located between the semiconductor laser 2 and the collimation lens 3, and the boundary line TG between the focusing grating couplers 12 and 13 on the substrate 10 is parallel to the track tangent line $T_R$. In addition, the optical system is aligned such that the light illuminated from the semiconductor laser 2 has an optical axis passing a center of the region of the focusing grating couplers (a center on the boundary line $T_G$) on the substrate and centers respectively of the collimation lens 3 and the objective 4.

The light emitted from the semiconductor laser 2 proceeds, with the spot of the light expanding in the space, through the substrate 10 and the focusing grating couplers 11, 12, and 13 (diffraction light of order 0) to be collimated by the collimation lens 3. The collimated light is then focused by the objective 4 onto a surface of the magnetooptical disk 9. A light reflected from the disk surface is then passed through the objective 4 and the collimation lens 3 to be converged so as to be incident to the region where the focusing grating couplers 11 to 13 are fabricated. As above, the Ep component of the reflection light is optically coupled as a TM mode light with the coupler 11 to be converged through the waveguide layer 14 on the substrate 10 so as to be detected by the photoelectric converter element 21, which in turn converts the light into an electric signal. The Es component of the light reflected from the magnetooptical disk 9 is respectively coupled with the gratings 12 and 13. The lights propagate as TE mode lights through the waveguide 14 to be converged onto the photoelectric converter including the partitions 22a and 22b and the photoelectric converter comprising the partitions 23a and 23b, respectively. The received lights are similarly transformed into electric signals.

When the light is projected onto a spot on the magnetooptical disk 9 and the spot is deviated from an object track, the amounts of lights respectively incident to the grating couplers 12 and 13 on the left-half and right-half portions of the region vary depending on the deviation. This consequently alters the amounts of lights respectively received by the photoelectric conversion element pairs 22a and 22b and 23a and 23b. In this situation, in order to generates a tracking error signal, the signals respectively generated from the photoelectric converters 22a and 22b are added to each other by an adder 38, whereas signals respectively created from the photoelectric converters 23a and 23b are added to each other by an adder 35. The resultant signals are supplied to a subtractor 34, which in turn produces a difference therebetween, thereby producing a tracking error signal in accordance with a push-pull detection method.

Moreover, when the distance between the magnetooptical disk 9 and the objective 4 undergoes a change, the focusing positions of the lights converged respectively by the focusing grating couplers 12 and 13 onto the waveguide layer 14 are shifted toward a light propagating direction. With this phenomenon, these focusing positions are also deviated in a direction orthogonal to the direction of the light propagation. Consequently, when the distance between the magnetooptical disk 9 and the objective 4 becomes greater, the amounts of lights respectively incident to the photoelectric conversion elements 22a and 23a disposed respectively at inner positions of the waveguide layer 14 are increased. Conversely, when the distance above is reduced, namely, when the magnetooptical disk 9 approaches the objective 4, the amounts of lights guided into the photoelectric converter elements 22b and 23b disposed at respective outer positions of the waveguide layer 14 are increased. In order to attain a focusing error signal, the signals, respectively produced from the inner elements 22a and 23a are added to each other by an adder 37, whereas the signals respectively generated from the outer elements 22b and 23b are added to each other by an adder 36. These signals are fed to a subtractor 33, which then computes a difference therebetween, thereby creating a focusing error signal according to the Foucault detection method.

Information recorded on the magnetooptical disk 9 is represented in terms of a rotation angle of the polarization direction of the reflection light (Kerr effect). The rotation angle is expressed by variations in the quantities of Ep and Es components of the reflection light. The magnitude of the Ep component coupled with the focusing grating coupler 11 is transformed by the photoelectric conversion element 21 into an electric signal. On the other hand, the magnitude of the Ep component coupled with the focusing grating couplers 12 and 13 is attained by computing additions by use of the adders 35, 38, and 32 on the signals generated from the photoelectric conversion elements 22a, 22b, 23a, and 23b, respectively. That is, the signal from the conversion element 21 and the signal from the adder 32 are supplied to a subtractor 31, which computes a difference therebetween, thereby producing an information readout signal.

Figure 2:
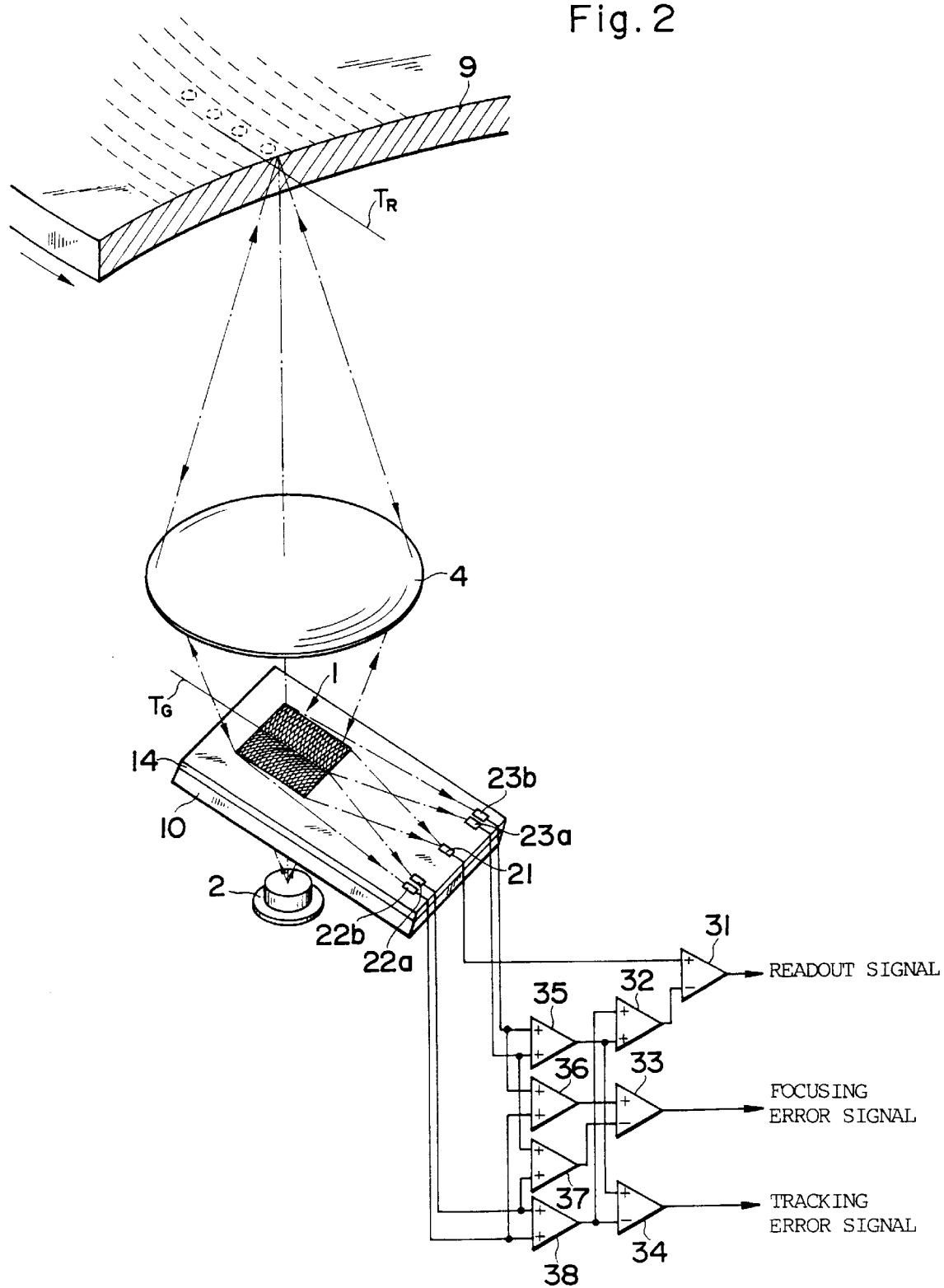
FIG. 2 is a perspective view schematically showing a variation of the optical system of an optical pickup device.

FIG. 2 shows a variation example of the optical system described above in which the collimation lens 3 is omitted. The objective 4 is utilized to converge the emitted light and to focus the reflection light. This optical system includes a minimized number of lenses; consequently, the structure thereof is remarkably simplified and the weight is further reduced.

In the optical systems respectively shown in FIGS. 1 and 2, the substrate 10 associated with the composite focusing grating coupler 1 is positioned between the semiconductor laser 2 and the collimation lens 3 or between the semiconductor laser 2 and the objective 4 such that the reflection light is received, which being focused by the lens 3 or 4, by the composite focusing grating coupler 1. In consequence, the diameter of the incident light becomes smaller and hence the region where the grating coupler 1 is formed can be minimized, which facilitates the manufacturing of the grating coupler 1.

Naturally, in the structure of FIG. 1, the substrate 10 may be located between the collimation lens 3 and the objective 4.

The composite focusing grating coupler 1 described above is fabricated through the following process.

An electron beam resist is coated on a predetermined substrate so as to draw a pattern of the composite focusing grating coupler as shown in FIG. 3 on the resist layer according to the electron beam lithography. After developing the resist layer, there is formed a composite focusing grating coupler pattern of the remaining resist film.

The coupler pattern of the remaining resist is then transcribed by an electroforming method or the like to produce a stamper made of nickel.

An ultraviolet (UV) ray setting resin is filled up in a gap between the nickel stamper and a substrate (e.g. a glass substrate) 10. With the stamper and the substrate being pushed against each other, an ultraviolet ray is irradiated thereonto so as to solidify the UV setting resin. As a result, the waveguide layer 14, the focusing grating coupler 11, and the focusing grating couplers 12 and 13 are formed with the UV setting resin in an integrated fashion.

Figure 6:
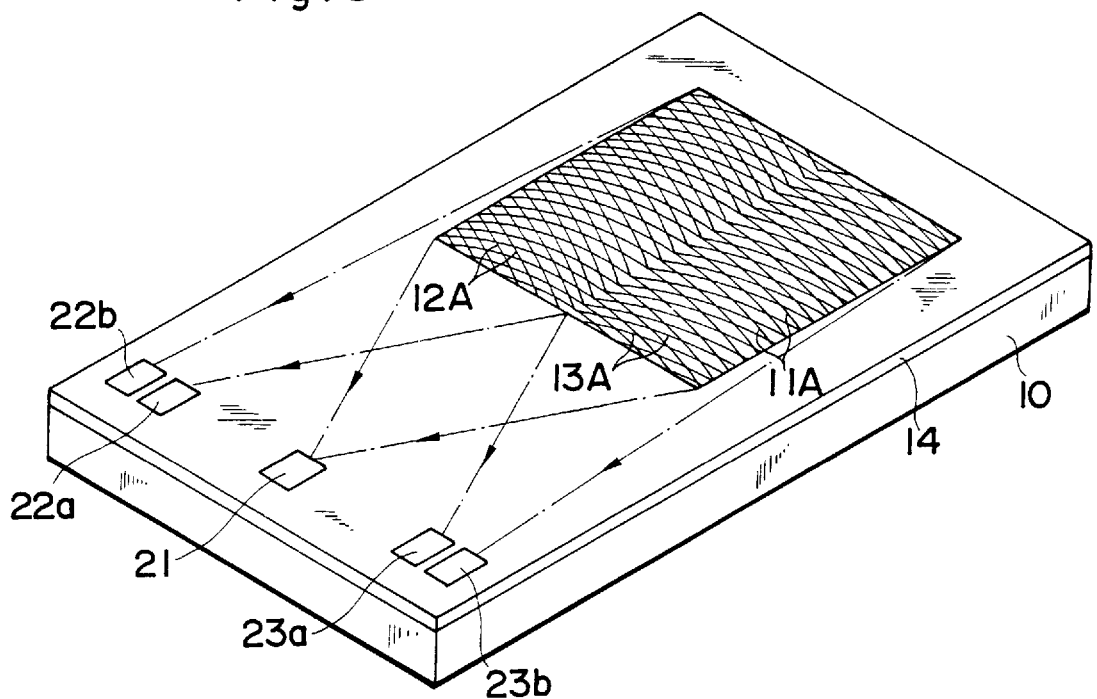
FIG. 6 is an overall perspective view showing an alternative example of the structure of an optical system including a waveguide substrate and a composite focusing grating coupler manufactured thereon.
Figure 7:
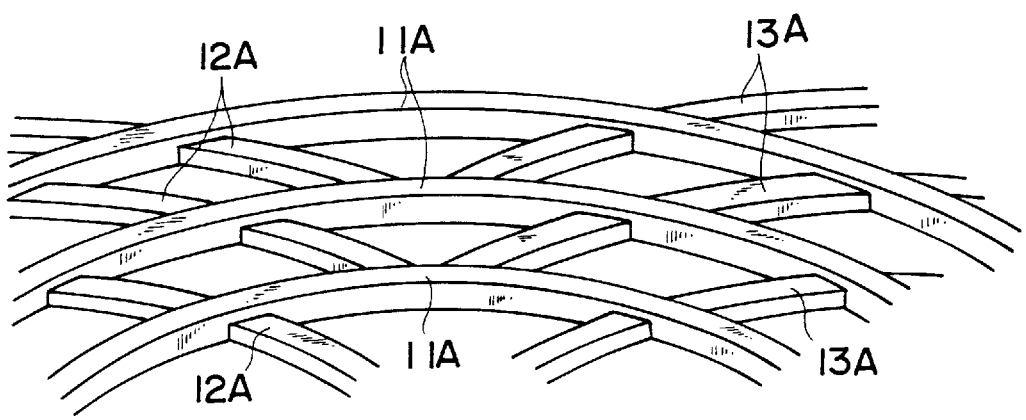
FIG. 7 is a magnified perspective view of a portion of the constitution of FIG. 6.

FIGS. 6 and 7 show another example of the configuration of a composite focusing grating coupler.

Basically, this coupler is structurally identical to that described in conjunction with FIGS. 3 to 5. Namely, in these diagrams, the focusing grating couplers 11A, 12A, and 13A are associated with the couplers 11, 12, and 13, respectively.

As shown in FIG. 7, the grating 11A disposed to excite the TM mode light has a thickness (a height of a projected stripe) different from those of the gratings 12A and 13A employed for the TE mode excitation. The thicknesses of the gratings develop an influence on a diffraction efficiency (coupling efficiency) thereof. For each of the gratings 11A to 13A, intensity of the focused light can be regulated (e.g. equalized) by controlling the thickness thereof. Consequently, when producing a differential signal (information readout signal) between the TE and TM mode lights, the output levels respectively of the TE and TM mode lights can be set to an identical value.

Although the embodiment above is related to a stepindexgrating structure, there may naturally be adopted a grating configuration having an arbitrary cross-sectional contour, for example, a blazed grating cons titution for the purpose above.

Figure 8:
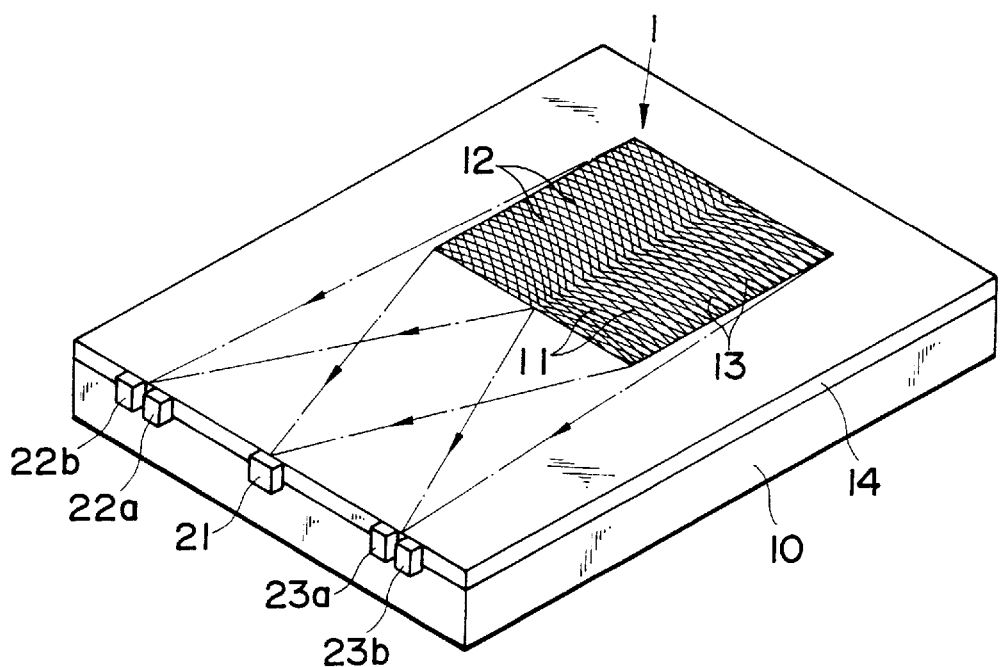
FIG. 8 is a perspective view showing another example of the waveguide substrate.

FIG. 8 shows another example of the configuration of a waveguide substrate on which composite focusing grating couplers are fabricated. Each of these couplers 11 to 13 are formed to have a focusing point, which is found on an end surface of the substrate 10. Moreover, at the focusing points of the respective couplers 11 to 13 on the end surface of the substrate 10, there are disposed (e.g. bonded) photoelectric converter elements (such as photodiodes) 21, 22a, 22b, 23a, and 23b.

Figure 9:
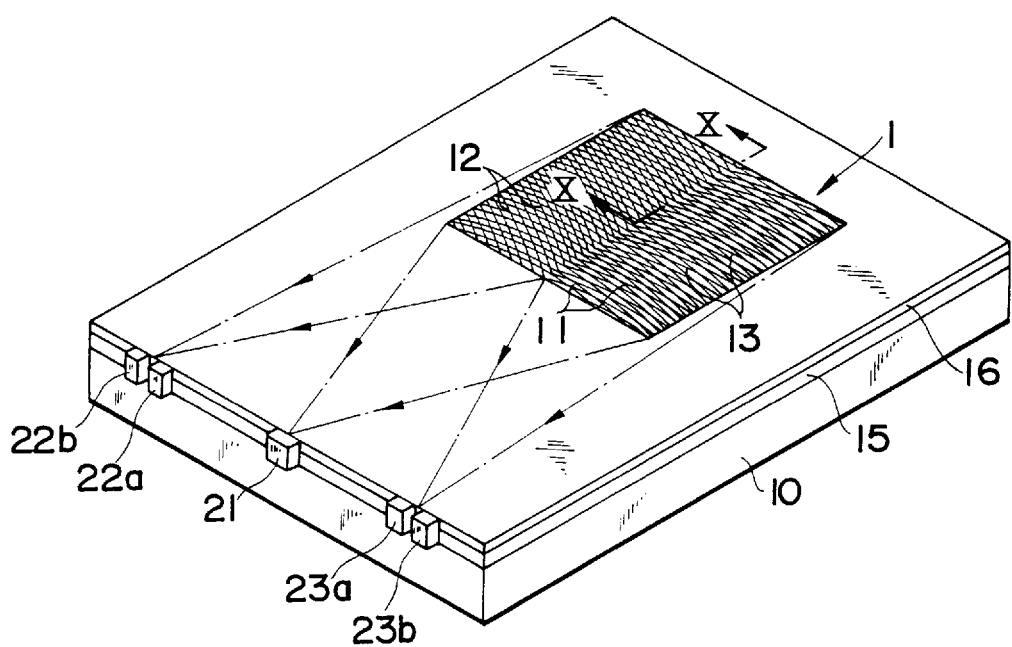
FIG. 9 is a perspective view showing still another example of the waveguide substrate.
Figure 10:
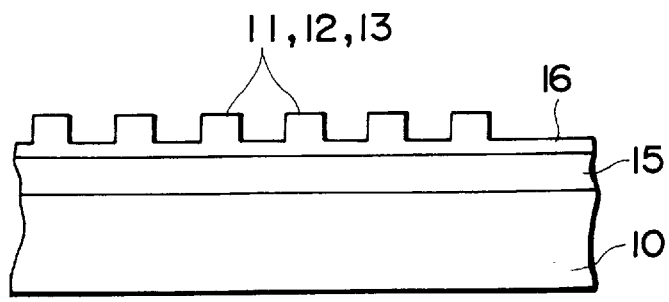
FIG. 10 is a magnified cross-sectional view taken along a line X—X of FIG. 9.

FIGS. 9 and 10 show still another example of the configuration of a waveguide substrate on which a composite focusing grating couplers are fabricated. In this structure, an inorganic material such as ZnS or ZnO is sputtered on the substrate 10 to manufacture an optical waveguide 15. Focusing grating couplers 11 to 13 are fabricated thereon with an UV setting resin. In the process of forming the gratings with the UV setting resin, there is spontaneously created a thin film of the UV setting resin 16 on the waveguide 15.

The composite focusing grating coupler can also be produced in a method similar to those described above. Namely, the optical waveguide 15 is formed on the substrate and then the UV setting resin is filled up in a gap between the waveguide layer 15 and a stamper of the composite grating pattern. Thereafter, an ultraviolet ray is irradiated thereonto to solidify the resin, thereby manufacturing the composite focusing grating coupler.

Since the optical waveguide layer 15 is fabricated through processes employing the thin film technology, for example, the sputtering of the inorganic substance, the film thickness of the waveguide layer 15 can be easily controlled.

Figure 11:
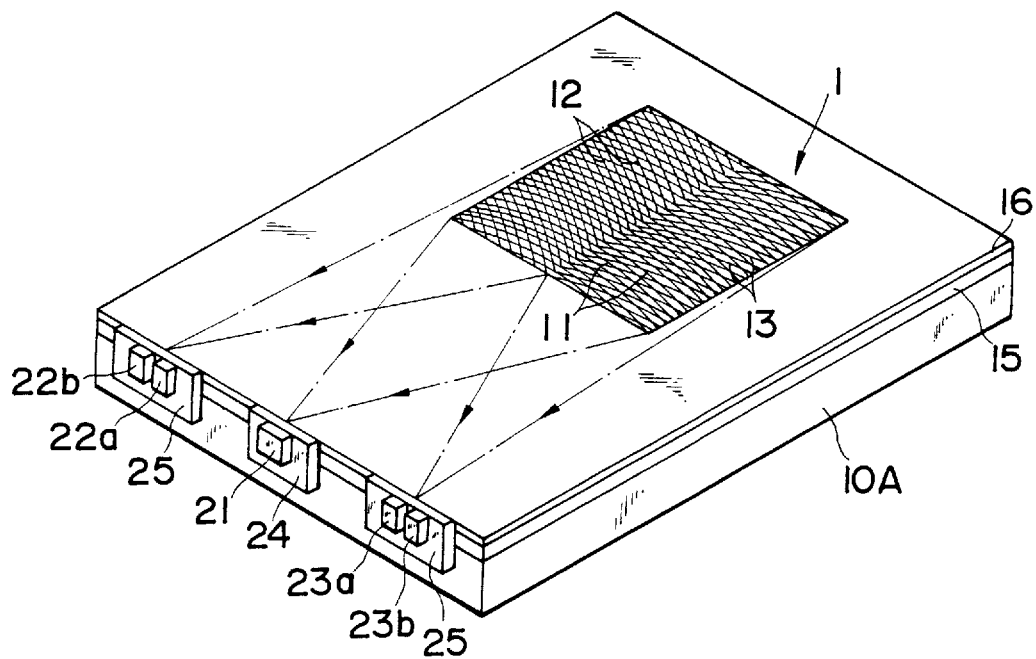
FIG. 11 is a perspective view showing further another example of the waveguide substrate.

FIG. 11 shows further another example of the configuration including a waveguide substrate and a composite focusing grating coupler formed thereon.

This structure includes a polarizing plate 10A as a substrate. The polarizing plate 10A passes therethrough a polarized light as a component of the light emitted from the semiconductor laser 2. In an alternative configuration, a polarizing film may be formed on a glass substrate for the purpose above.

With the provision of the polarizing and separating function of the waveguide substrate, even when the light emitted from the laser 2 slightly includes a light component other than a linearly polarized light, the component can be removed. In addition, only if the polarization direction of the waveguide substrate 10A is accurately aligned, the semiconductor laser 2 need not be correctly positioned, namely, it is unnecessary that the polarization direction of the light produced from the laser 2 is inclined exactly by 45° relative to the direction $T_R$ of the tangent line of the track prepared on the magnetooptical disk 9. This is particularly effective when the substrate 10A can be easily aligned as compared with the semiconductor laser 2.

More over, in the constitution example of FIG. 11, a polarizing plate 24 is disposed on a front side of the light receiving surface of the photoelectric conversion element 21 arranged on the end surface of the substrate 10A. Similarly, a polarizing plate 25 is disposed on a front side of the light receiving surface of each of the element pairs 22a and 22b and 23a and 23b. The polarizing plate 24 passes therethrough only a light having a polarization direction related to the TM mode. As a result, even if a light other than a TM mode light, for example, a TE mode light is optically coupled with the focusing grating coupler 11, the photoelectric converting element 21 can detect only the TM mode light. In a similar manner, the polarizing plate 25 passes therethrough only a light having a polarization direction associated with the TE mode. Consequently, only the TE mode light is received by the photoelectric converter elements 22a, 22b, 23a, and 23b.

Without employing a polarizing plate for the substrate, there may be disposed only the polarizing plates 24 and 25. Conversely, without arranging the polarizing plates 24 and 25, a polarizing plate may be used as the substrate.

Figure 12:
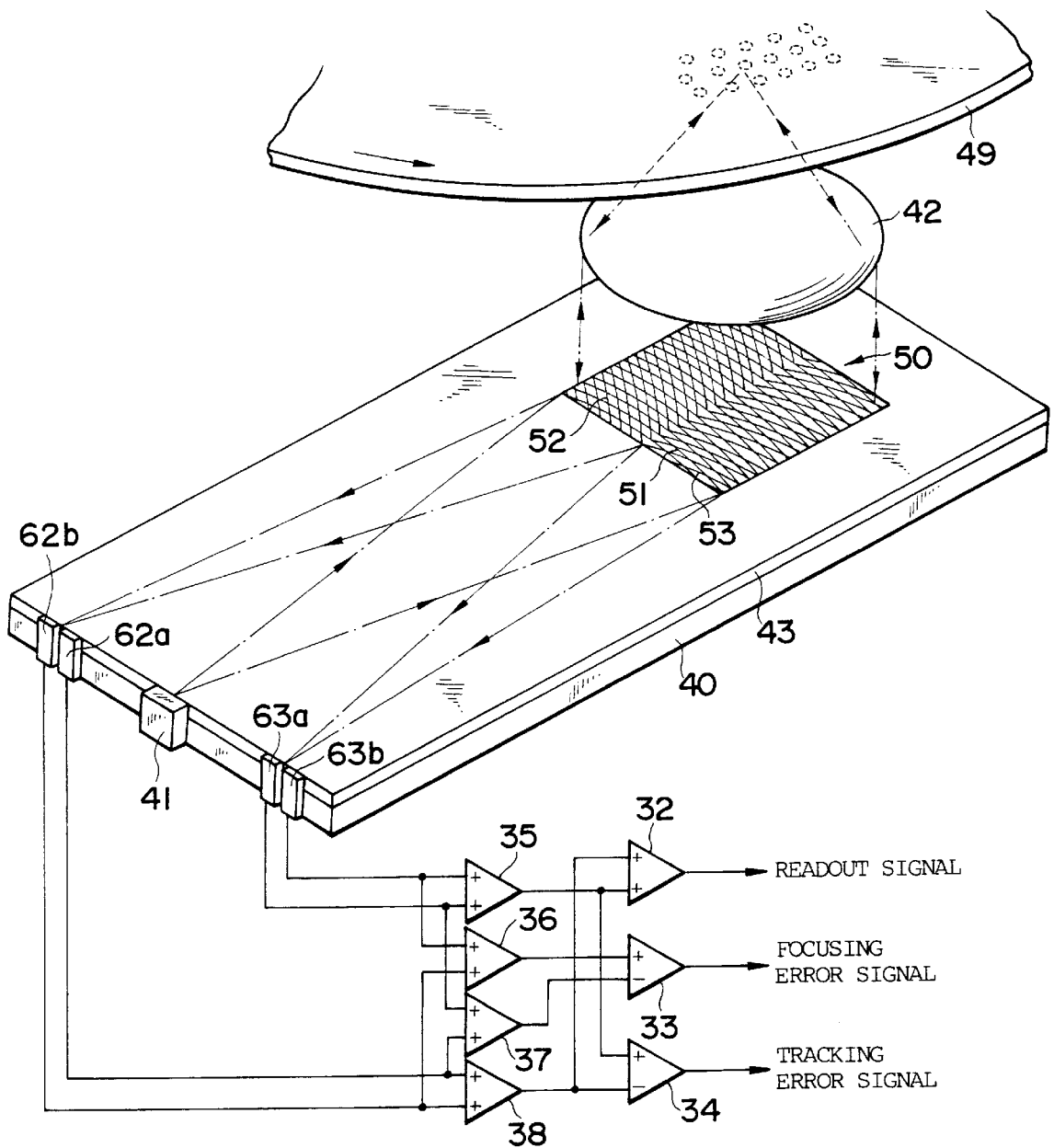
FIG. 12 is a perspective view illustratively showing an optical system of an optical pickup device in a second embodiment according to the present invention.

FIG. 12 shows the construction of an optical pickup device in a second embodiment according to the present invention. The pickup device is configured to be suitably adopted to read information stored on an optical disk.

In the structure of this embodiment, an optical waveguide layer 43 is formed with an UV setting resin on a glass substrate 40. A composite focusing grating coupler 50 is manufactured in the waveguide layer 43. The coupler 50 may be formed with a UV setting resin together with the waveguide 43 in an integrated manner by using a stamper according to a method described above. The composite focusing grating coupler 50 includes a focusing grating coupler 51 disposed for projecting lights and fabricated in the overall region and two focusing grating couplers 52 and 53 for receiving lights respectively arranged in a first-half portion and a second-half portion of the area. The grating coupler 51 is superimposed onto the grating couplers 52 and 53. These couplers 51 to 53 may have an identical grating period. The mode of a light propagating through the waveguide 43 is decided by the direction of the plane of polarization of the light emitted from the semiconductor laser 41.

The semiconductor laser 41 is fixedly arranged on an end surface of the substrate 40. The emission light from the laser 41 propagates, while expanding in the waveguide 43, through the waveguide layer 43 and is then incident to the composite focusing grating coupler 50 to be emitted upward as a collimated light by the light projection grating coupler 51. The collimated light is then converged through an objective 42 to form a light spot at a position in the proximity of a surface of an optical disk 49.

Assuming that a pit string representing information is in advance formed on the optical disk 49, the light projected onto the surface of the disk 49 is reflected from a pit with its intensity modulated. The reflection light from the optical disk 49 enters, while expanding a diameter thereof along the propagating direction, the objective 42 to be delivered as a collimated light to the composite focusing grating coupler 50. In this connection, each of the light reception grating couplers 52 and 53 develops three functions i.e. a wavefront separation, a deflection, and a convergence of lights. The reflection light is coupled through the couplers 52 and 53 with the waveguide layer 43. In each coupler above, the light is propagated through the waveguide layer 43 in an associated direction while being converged therethrough. The respective lights are then received by photoelectric conversion element pairs 62a and 62b and 63a and 63b of a two-partition type fixedly disposed on the end surface of the substrate 40. As described above, based on signals created from the photoelectric conversion elements 62a, 62b, 63a, and 63b, an information readout signal, a focusing error signal, and a tracking error signal are similarly produced. In this configuration, signals respectively outputted from adders 35 and 38 are again added to each other by an adder 32, thereby obtaining the information readout signal.

In the structure of the embodiment of FIG. 12, since the objective 42 is disposed between the optical disk 49 and the substrate 40, the focusing control operation is accomplished by controlling the position of the objective 42.

Figure 13:
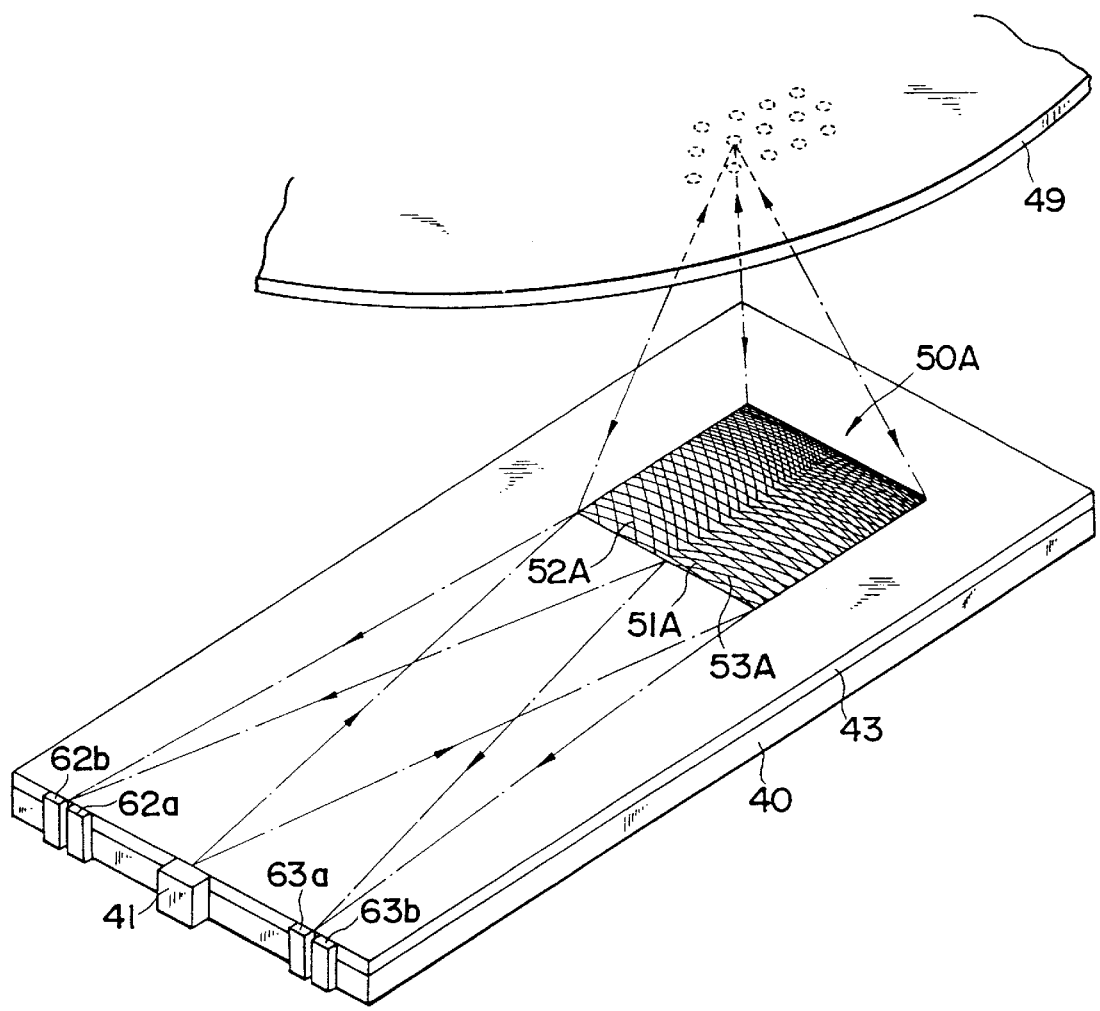
FIGS. 13, 14, and 15 are perspective views schematically showing variations of the optical system of an optical pickup device.

FIG. 13 shows a variation example of the configuration of the optical pickup device wherein the objective is omitted. This constitution includes a composite focusing grating coupler 50A of a chirped structure. That is, a focusing grating 51A for projecting lights and focusing gratings 5A and 53A for receiving lights are manufactured in a chirped contour so as to develop a function to converge a light emitted therefrom and a light incident thereto. A light illuminated from a semiconductor laser 41 is transmitted via a waveguide 43 to be emitted upward as a converged light through the focusing grating coupler 51A, thereby forming a light spot on a surface of the optical disk 49. A light reflected from the surface of the optical disk 49 is then incident to the couplers 52A and 53A. In each of the couplers, the received light propagates through the waveguide 43 to enter, while being converged therethrough, a photoelectric conversion element associated therewith. Namely, the lights respectively related to the couplers 52A and 53A are received by the photoelectric conversion element pairs 62a and 62b and 63a and 63b, respectively. In this modified example, the focusing control is achieved by regulating the position of the substrate 40.

Figure 14:
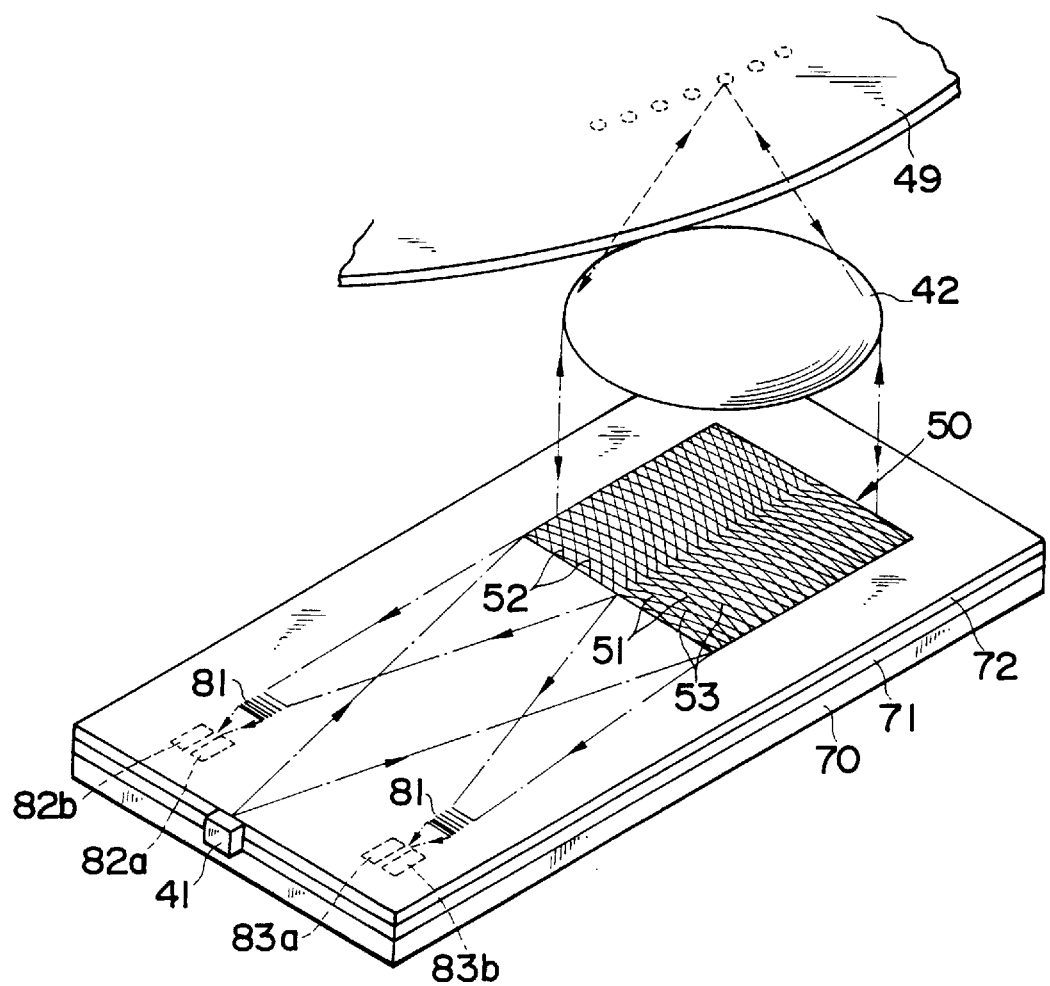

FIG. 14 shows still another variation example of the grating coupler configuration, which comprises an n-type silicon substrate 70. On a buffer layer 71 prepared with a UV setting resin thereon, an optical waveguide film 72 is formed with a thin film material such as ZnO or ZnS. On the waveguide layer 72, there is integrally fabricated a composite focusing grating coupler 50.

Figure 16:
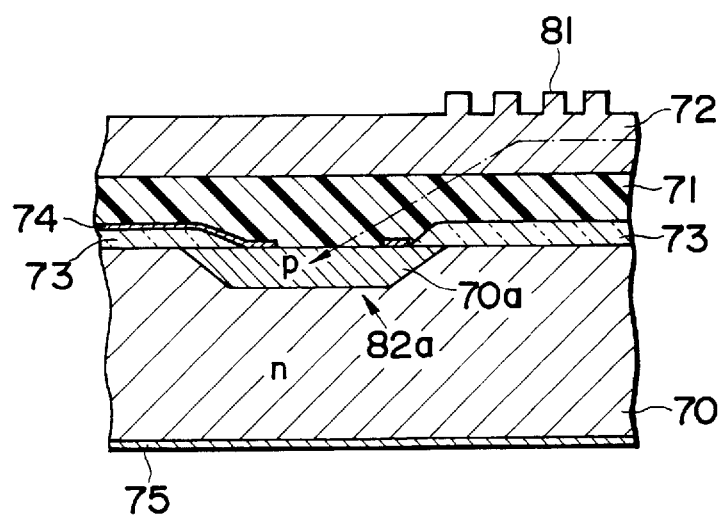
FIG. 16 is a magnified cross-sectional view showing a photoelectric conversion element formed in a substrate.

Since the substrate 70 is fabricated with an n-type silicon, two-partition photoelectric conversion elements (pn junction photodiodes) 82a, 82b, 83a, and 83b are integrally formed on the substrate 70. That is, as can be seen from a magnified cross-sectional view thereof shown in FIG. 16, a p-type impurity substance is doped into the n-type silicon substrate 70 to create a p-type region 70a forming a pn junction, thereby configuring an photoelectric conversion element 82a (this method is also adopted to produce the elements 82b, 83a, and 83b). Surface areas other than the surface of the p-type region 70a are coated with an $SiO_2$ insulation layer 73, and an electrode layer 74 is formed in the periphery of the p-type region 70a. The electrode 74 and an electrode 75 manufactured on a rear surface of the substrate 70 are utilized to obtain a light reception signal. In addition, a grating coupler 81 is fabricated on the waveguide layer 72. In operation, a light coupled through the focusing grating coupler 52 (or 53) with the waveguide 72 is propagated therethrough while being converged along its propagation. The converged light is then diffracted by the grating coupler 81 to be incident to the p-type region 70a. Since the photoelectric converter elements are manufactured to be integral with the substrate 70, a highly integrated device can be produced.

Figure 15:
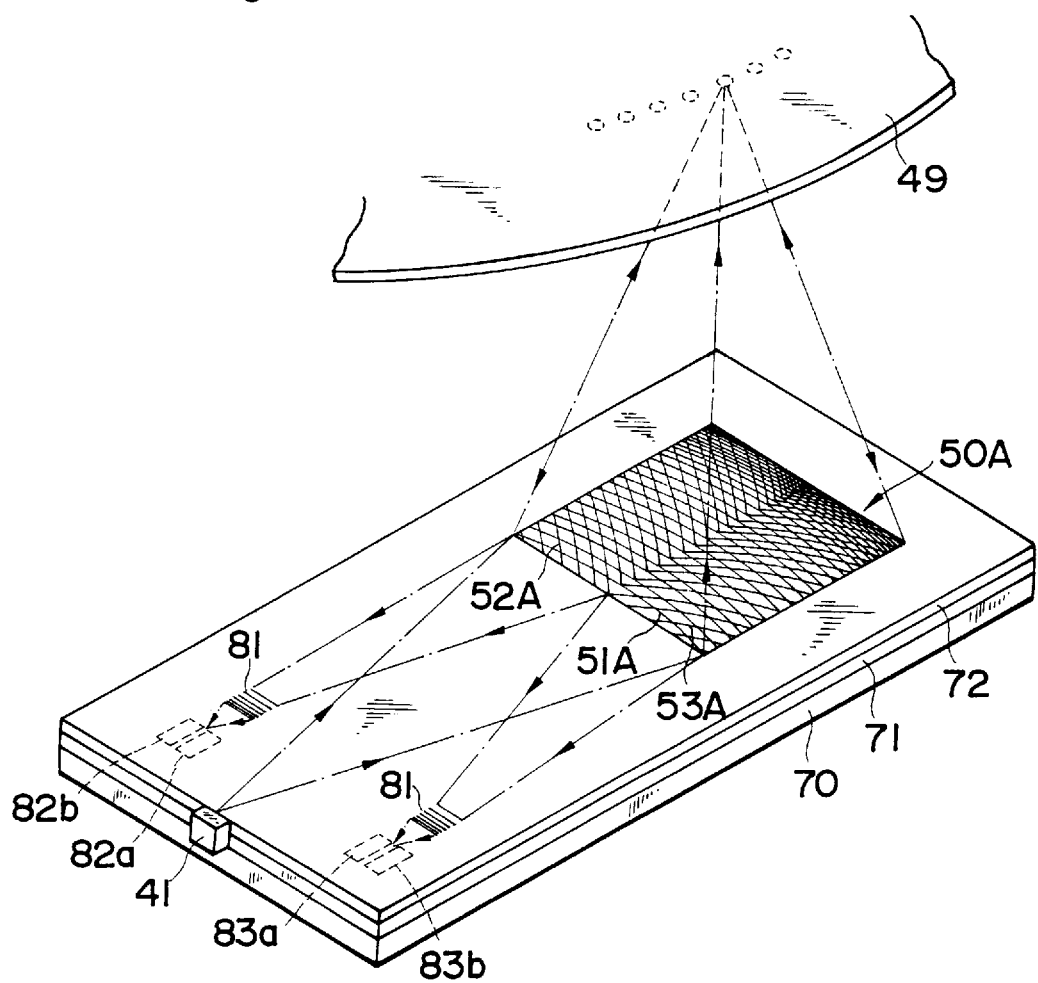

FIG. 15 shows still another modified example of the optical system including a substrate and a composite focusing grating coupler formed thereon. This sturcture employs the waveguide layer 72 on the substrate on which the photoelectric conversion elements are manufactured as shown in FIG. 14. Namely, on the waveguide layer 72, a composite focusing grating coupler 50A of a chirped contour which is shown in FIG. 13 is fabricated; whereas, the objective is omitted.

FIGS. 17a to 17f show a process of manufacturing the waveguide layer 72 in the constitution of FIG. 14 or 15.

First, there is created a stamper 85 with nickel having contours respectively of the composite focusing grating coupler 50 (or 50A) and the linear grating coupler 81 (FIG. 17a). The stamper 85 may be produced by using a mother board or an original board prepared in advance according to the electron beam lithography as described above.

Subsequently, the space between the stamper 85 and the glass substrate 87 is filled up with a UV setting resin 86, which is then irradiated by an ultraviolet ray for a solidification thereof (FIG. 17b). Thereafter, the stamper 85 is removed from the resin layer 86 (17c)

On the UV setting resin film 86 on which the grating patterns are thus transcribed, a substance such as ZnO or ZnS is sputtered to form the waveguide layer 72 (FIG. 17d). In this procedure, the thickness of the waveguide layer 72 can be advantageously controlled with a high precision.

Moreover, a UV setting resin 71A as the material of the buffer layer 71 is filled up in a gap between the waveguide layer 72 and the silicon substrate 70 on which the p-type region 70a, the $SiO_2$ layer 73, and the electrode regions 74 and 75 are beforehand manufactured. The resin 71A is then solidified under an ultraviolet ray irradiation (FIG. 17e).

Finally, the glass substrate 87 is removed from the UV setting resin film 86 (FIG. 17f). Depending on cases, the UV setting resin film 86 may be kept remained in the configuration.

Figure 18:
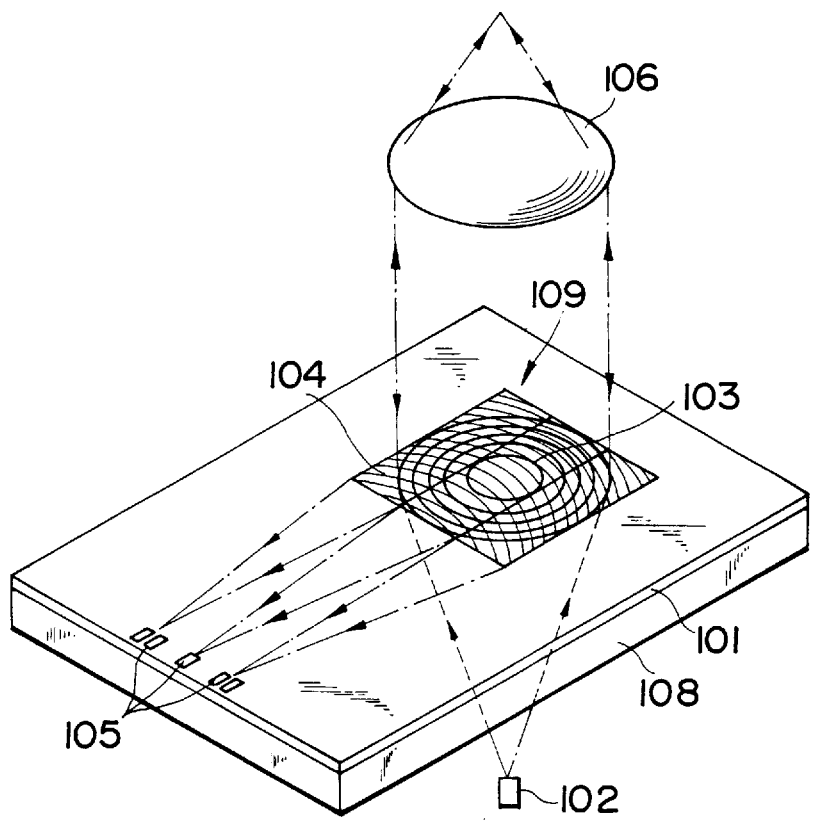
FIG. 18 is a perspective view illustratively showing an optical system of an optical pickup device in a third embodiment according to the present invention.
Figure 19:
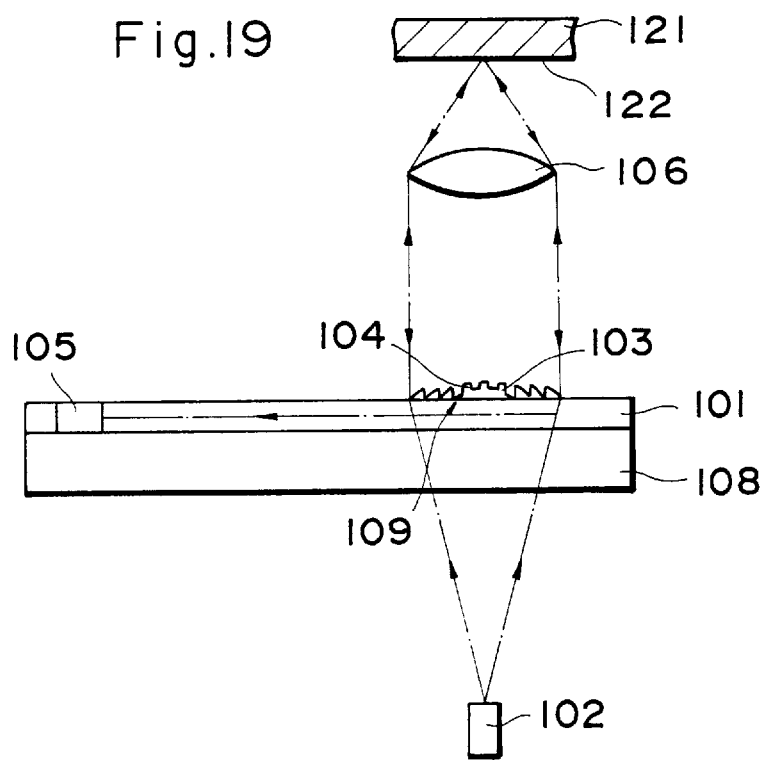
FIG. 19 is a cross-sectional view showing the optical system of FIG. 18.

FIG. 18 is a perspective view showing an optical pickup device in a third embodiment according to the present invention, whereas FIG. 19 is a cross-sectional view of the system of FIG. 18.

The optical pickup device is constituted with a light emitting element 102 such as a semiconductor laser, a glass substrate 108, and an objective 106, for example, a convex lens. On a surface of the glass substrate 108, there is formed an optical waveguide layer 101 with a transparent material having a refractive index larger than that of the glass substrate 108. A transmission micro Fresnel lens 103 and a focusing grating coupler 104 a re manufactured on a surface of the waveguide layer 101. A plurality of light receiving elements 105 such as photodiodes are buried in an end portion of the waveguide layer 101. The micro Fresnel lens 103 and the focusing grating coupler 104 are fabricated with an identical substance in a superimposed fashion at an identical location on the waveguide layer 101 so as to constitute a composite grating element 109.

As clearly shown in FIG. 19, the light emission element 102 is aligned to an optical axis of the micro Fresnel lens 103 so as to be arranged on a rear side of the substrate 108, whereas the objective 106 is disposed on a front side of the substrate 108.

Under the condition above, when reading information or data stored in an optical disk 121, the electric driving power to be supplied to the light emitter element 102 is decreased so that the light emitter 102 is controlled to illuminate a light with a reduced power. The emission light from the light emitting element 102 passes through the glass substrate 108 and is then collimated by the micro Fresnel lens 103. The collimated light is then converged by the objective 106 onto a focal point on a recording surface 122 of the optical disk 121. In a focusing control operation, the objective 106 is moved with the substrate 108 kept remained at a position so that the light is focused on the recording surface 122. This is also the case when achieving a tracking adjustment and/or when moving the optical pickup device between tracks over the recording surface 122. The reflection light from the recording surface 122 is again collimated through the objective 106 to be illuminated onto the focusing grating coupler 104 on the substrate 108. The received light is coupled by the focusing grating coupler 104 with the waveguide layer 101 to be propagated therethrough so as to be received by the light receiving elements 105, which produce based on the received light a signal representing data stored on the recording surface 122.

When writing information or data on a surface of the optical disk 121, the light emitting element 102 is controlled to emit a light with a reduced power like in the case of the read operation above. A light reflected from the recording surface 122 is sensed by the light reception elements 105 to confirm a write position. Thereafter, the power driving the light emitting element 102 is increased so that the light emitting element produces a light with a power sufficient to write data on the recording surface 122, thereby storing data thereon. The light has already passed through the micro Fresnel lens 103 having a diffraction efficiency higher than that of the focusing grating coupler 104; consequently, the light c an be emitted onto the recording surface 122 with an intensity sufficient for the data write operation. After the data is written thereon, the power of the light emitting element 102 is reduced so as to confirm the data thus loaded in the optical disk 121.

In the constitution of the optical pickup device of the third embodiment, a portion of the emission light from the light emitting element 102 is coupled via the focusing grating coupler 104 with the waveguide 101 to be thereafter detected by the light receiving elements 105. In this situation, the received light appears as a noise component of the signal produced from the light reception elements 105. However, in practice, this problem is negligible because the diffraction efficiency of the focusing grating coupler 104 is lower than that of the lens element e.g. the micro Fresnel lens 103.

Figure 20:
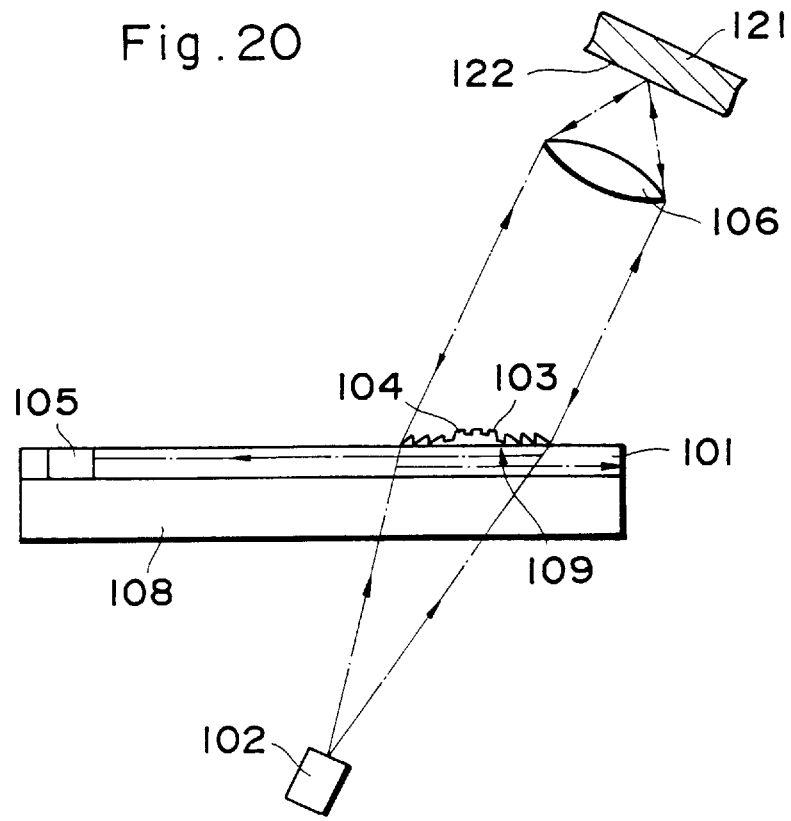
FIG. 20 is a cross-sectional view illustratively showing a variation of the optical system.

FIG. 20 shows a variation example of the optical pickup device in which the light emitter element 102 and the objective 106 are arranged to be inclined with respect to an optical axis of the micro Fresnel lens 103. In this constitution, even when a light emitted from the light emitting element 102 is coupled via the focusing grating coupler 104 with the waveguide 101, the light propagates therethrough toward an end portion thereof opposing to the end portion where the light receiving element 105 is disposed. In consequence, it cannot take place that the light appears as a noise component of the signal created from the light reception element 105. On the other hand, when a light reflected from the recording surface 122 is optically coupled by the focusing grating coupler 104 with the waveguide 101, the light is efficiently propagated therethrough to be received by the light receiving element 105. Consequently, according to the modified example of the configuration, the signal-to-noise ratio of the optical pickup device can be improved.

Figure 21:
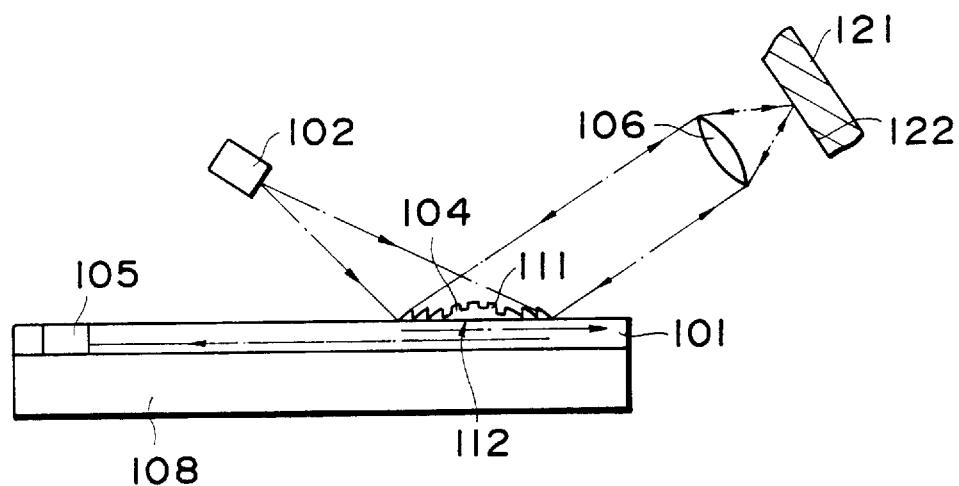
FIG. 21 is a cross-sectional view schematically showing another variation of the optical system.

FIG. 21 shows the constitution of another variation example of the optical pickup device. In this structure, on a surface of the waveguide 101, there are manufactured a micro Fresnel lens 111 of a reflective type and a focusing grating coupler 104 in a superimposed fashion, thereby forming a focusing grating coupler with a superimposed micro Fresnel lens 112. Since the configuration of this embodiment includes a reflective micro Fresnel lens 111, the light emitting direction of the light emitter element 102 can be arranged with an inclination such that the light emitter element 102 and the objective 106 are disposed on the front side of the substrate 108. In consequence, the emission light from the light emitting element 102 is reflected and is collimated by the reflective micro Fresnel lens 111; moreover, by adjusting the position of the objective 106 (in the focusing and tracking operations), the light can be focused onto a desired position on the recording surface 122. On the other hand, a light reflected from the recording surface 122 is optically coupled via the focusing grating coupler 104 with the waveguide 101 to be propagated therethrough so as to be received by the light reception elements 105.

Figure 22:
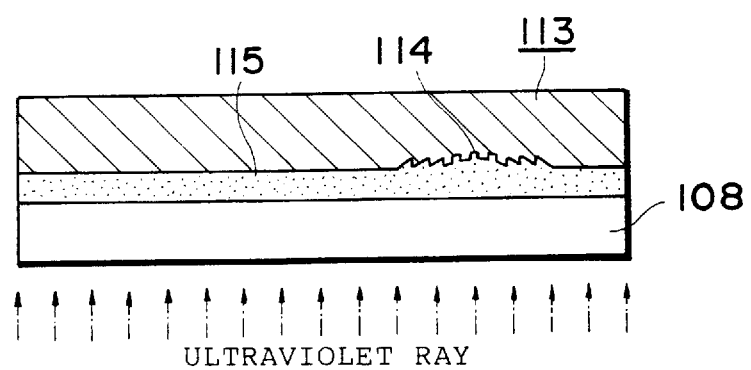
FIG. 22 is a cross-sectional view showing a process of manufacturing on a substrate a waveguide substrate, a micro Fresnel lens, and a crating coupler.

Using a UV setting resin, the composite element 109 and 112 and the optical waveguide 101 can be produced in a monoblock forming process as shown in FIG. 22. In this regard, a stamper 113 of nickel on which a female pattern of the composite element including the micro Fresnel lens 103 or 111 and the focusing grating coupler 104 are formed can be manufactured through an electroforming process by using a mother board prepared according to the electron beam lithography. A glass substrate 108 is disposed to oppose to the stamper 113 such that a UV setting resin 115 is filled in a gap between the substrate 108 and the stamper 113. The resin 115 is then solidified under an ultraviolet ray irradiation, thereby manufacturing at a time the waveguide layer 101, the micro Fresnel lens 103 or 111, and the focusing grating coupler 104 on the surface of the glass substrate 108. Thereafter, the stamper 113 is peeled off from the UV setting resin layer 115. This monoblock forming method is quite suitable for mass production of the optical pickup device and hence the production cost will be lowered.

Incidentally, the present invention is not restricted by the third embodiment and the variation examples thereof, namely, the optical pickup device can be designed and modified in various manners. For example, the grating coupler may develop a function to diverge a light. In such a situation, for example, even if the emission light is diverged by the grating coupler, the diverged light need only be converged through an objective. As the lens element including a micro Fresnel lens, there may also be adopted an off-axis lens having a function to change the propagation direction of light.

Figure 23:
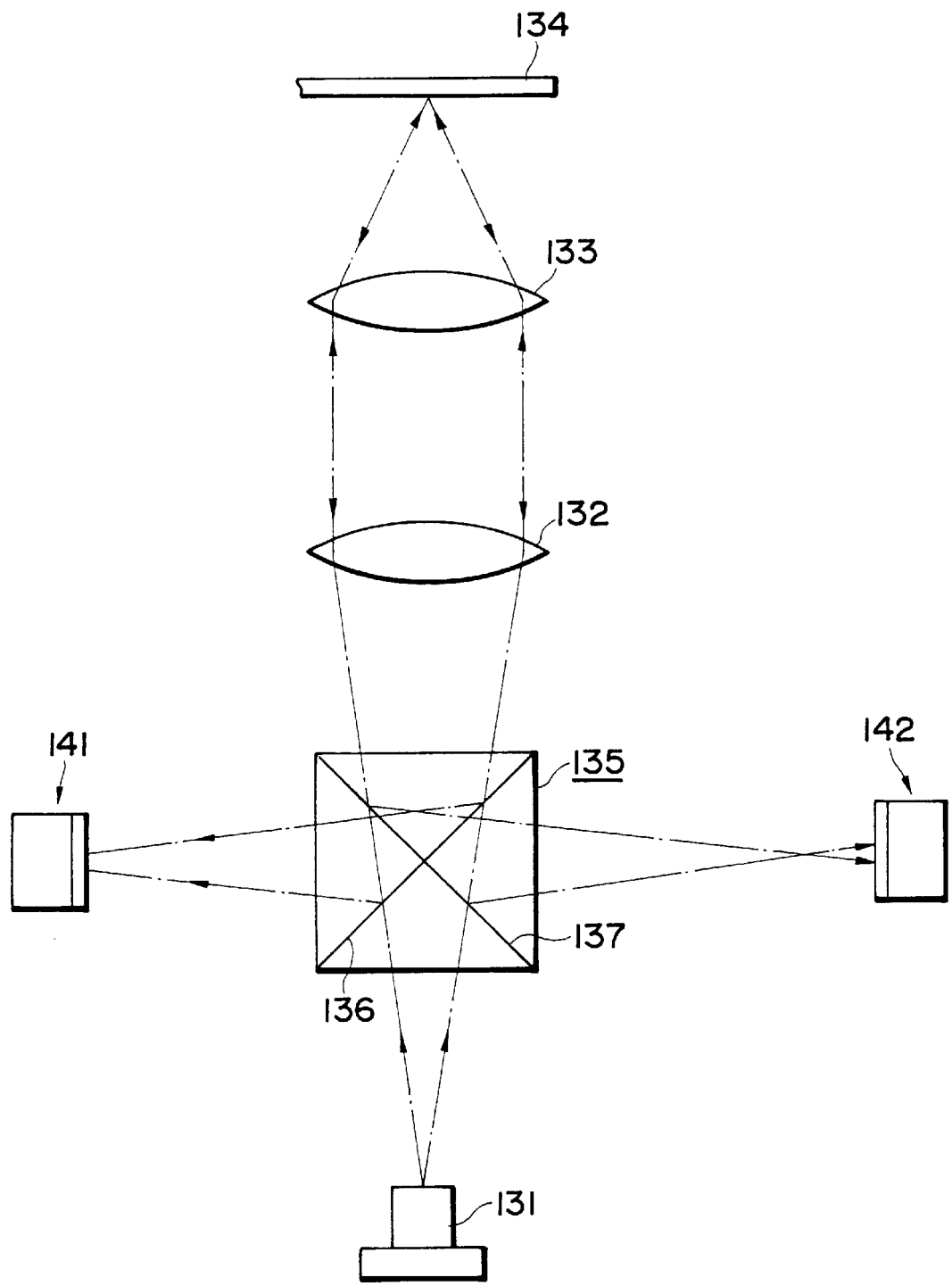
FIG. 23 is a schematic diagram showing the constitution of an optical system used in an optical pickup head of an information recording and reproducing apparatus for a magnetooptical disk in a fourth embodiment according to the present invention.
Figure 24A:
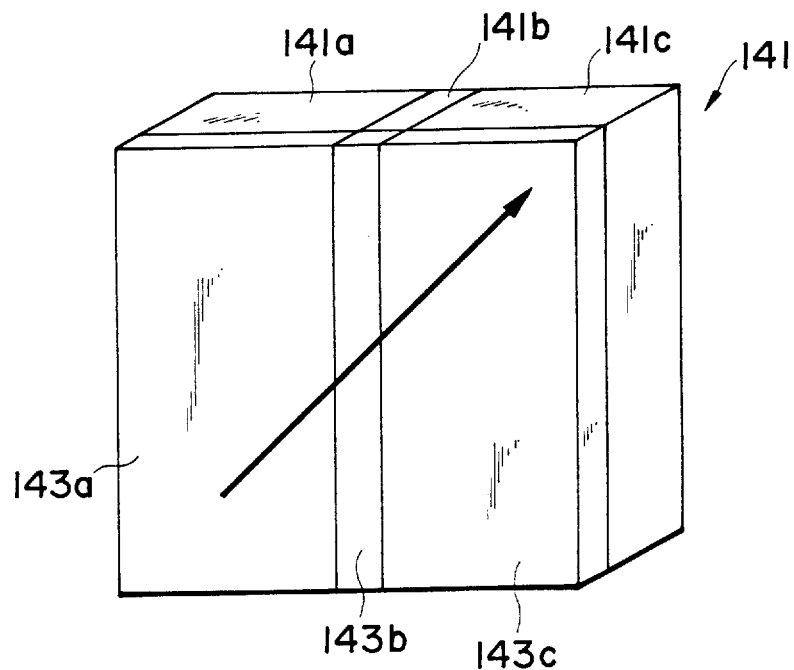
FIGS. 24a and 24b are perspective views showing the configuration of a photosensor.
Figure 24B:
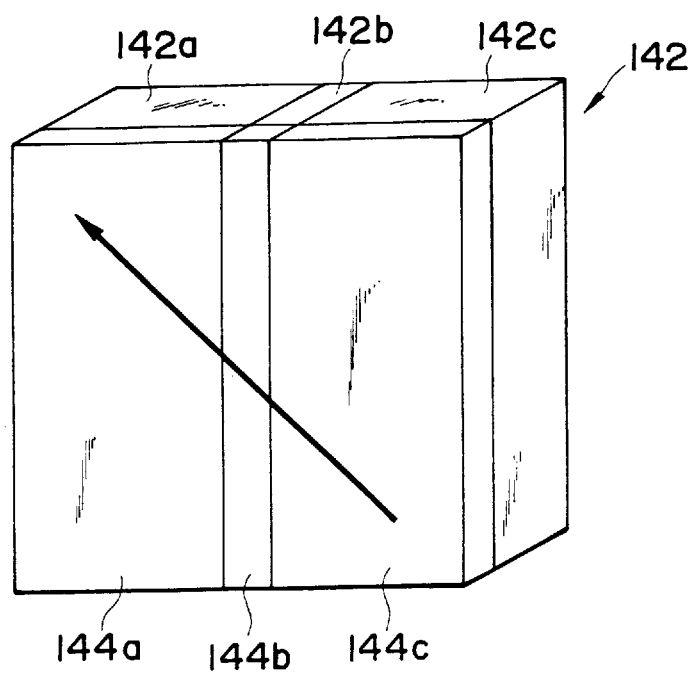

FIG. 23 and FIGS. 24a and 24b show a schematic diagram showing an optical pickup device as a fourth embodiment according to the present invention, that is the constitution of an optical pickup head used to record information on and to read information from a magnetooptical disk.

The optical head includes a semiconductor laser 131 and a focusing optical system for converging onto a surface of a magnetooptical disk 134 a divergent light emitted from the laser 131. The optical system comprises a collimation lens 132 for collimating the emitted light and an objective 133 for converging the collimated light.

A composite beam splitter 135 is disposed in an optical path of the divergent light between the semiconductor laser 131 and the collimation lens 132. The composite beam splitter 135 has two reflection surfaces 136 and 137, which are arranged to be orthogonal to each other. Each of the reflection surfaces is inclined by 45° with respect to an optical axis of the focusing optical system.

The compsite beam splitter 135 may be constituted with four dielectric blocks (e.g. glass prisms). Each of the blocks includes surfaces respectively coated with reflection films so as to develop functions respectively of the reflection surfaces 136 and 137. The combined four dielectric blocks are bonded to each other. The reflection surfaces 136 and 137 are configured so as to pass therethrough to a possible extent the emission light from the semiconductor laser 131 and to reflect a portion (for example, 10%) of a light reflected from the magnetooptical disk 134. In this regard, the optical reflection efficiency of each of the reflection surfaces 136 and 137 does not depend on the polarization of light.

The divergent light produced from the semiconductor laser 131 is transmitted through the composite beam splitter 135 to be converged by the focusing optical system onto the magnetooptical disk 134. A light reflected from the disk 134 is converged by the focusing optical system. While the reflection light is being converged through the optical system, portions thereof are reflected by the reflection surfaces 136 and 137 of the composite beam splitter 135, respectively. The reflected lights are then respectively received by photosensors 141 and 142 arranged respectively on the front and rear sides of associated focusing points of the reflected lights.

The photosensor 141 includes, as shown in a magnified perspective view of FIG. 24a, three photodiodes 141a, 141b, and 141c which are electrically independent of each other (three-partition photodiode unit). These photodiodes 141a to 141c are arranged in a line such that the central photodiode 141 has a light receiving surface smaller than those of the other ones. On the front surfaces respectively of the photodiodes 141a, 141b, and 141c, there are disposed analyzers 143a, 143b, and 143c, respectively.

The photosensor 142 also includes, as can be seen from a magnified view of FIG. 24b, three photodiodes 142a, 142b, and 142c which are electrically independent of each other and which are linearly arranged so that on the front surfaces respectively of the photodiodes 142a, 142b, and 142c, there are disposed analyzers 144a, 144b, and 144c, respectively.

The analyzers 143a to 143c arranged on the front surface of the photosensor 141 are associated with an identical polarization direction. Moreover, the analyzers 144a to 144c disposed on the front surface of the photosensor 142 are related to an identical polarization direction. The polarization direction of the analyzers 143a to 143c is set to be orthogonal to that of the analyzers 144a to 144c as denoted by arrow marks respectively in FIGS. 24a and 24b. The emission light from the semiconductor laser 131 has a polarization direction inclined by 45° with respect to each of the polarization directions respectively of the analyzers 143a to 143c and 144a to 144c.

Let us assume here that the photodiodes 141a, 141b, and 141c output signals having signal levels 141A, 141B, and 141C, respectively; moreover, the photodiodes 142a, 142b, and 142c are associated with signal output levels 142A, 142B, and 142C, respectively. When data recorded on a magnetooptical disk 134 is read therefrom, a readout signal has a signal level computed as (141A+141B+141C)−(142A+142B+142C)

Moreover, the output signals from the photosensors 141 and 142 are employed to produce a focusing error signal and a tracking error signal.

The focusing error signal is generated, for examp le, in a beam sizing method. Namely, the light beams received respectively by the photosensors 141 and 142 are processed so as to create therefrom signals designating ma gnitude s of the respective beams. Based on a signal difference therebetween, a focusing error signal is attained such that the output signal level thereof is represented as (141A+141C−141B)−(142A+142C−142B).

Moreover, the tracking error signal is produced, for example, according to a push-pull detection method. In this procedure, either one of the output signals respectively from the photosensors 141 and 142 is adopted for the signal generation such that the output level of the tracking error signal is represented as (141A−141C) or (142A−142C).

When the optical recording medium is implemented in the form of, for example, an optical disk or an optical card, the optical head configurations shown in FIGS. 23, 24a, and 24b are applicable without any modifications thereof, where the analyzers 143a to 143c and 144a to 144c are to be omitted. In this situation, the output signal level of the readout signal is expressed as (141A+141B+141C)+(142A+142B+142C), (141A+141B+141C), or (142A+142B+142C).

Figure 25:
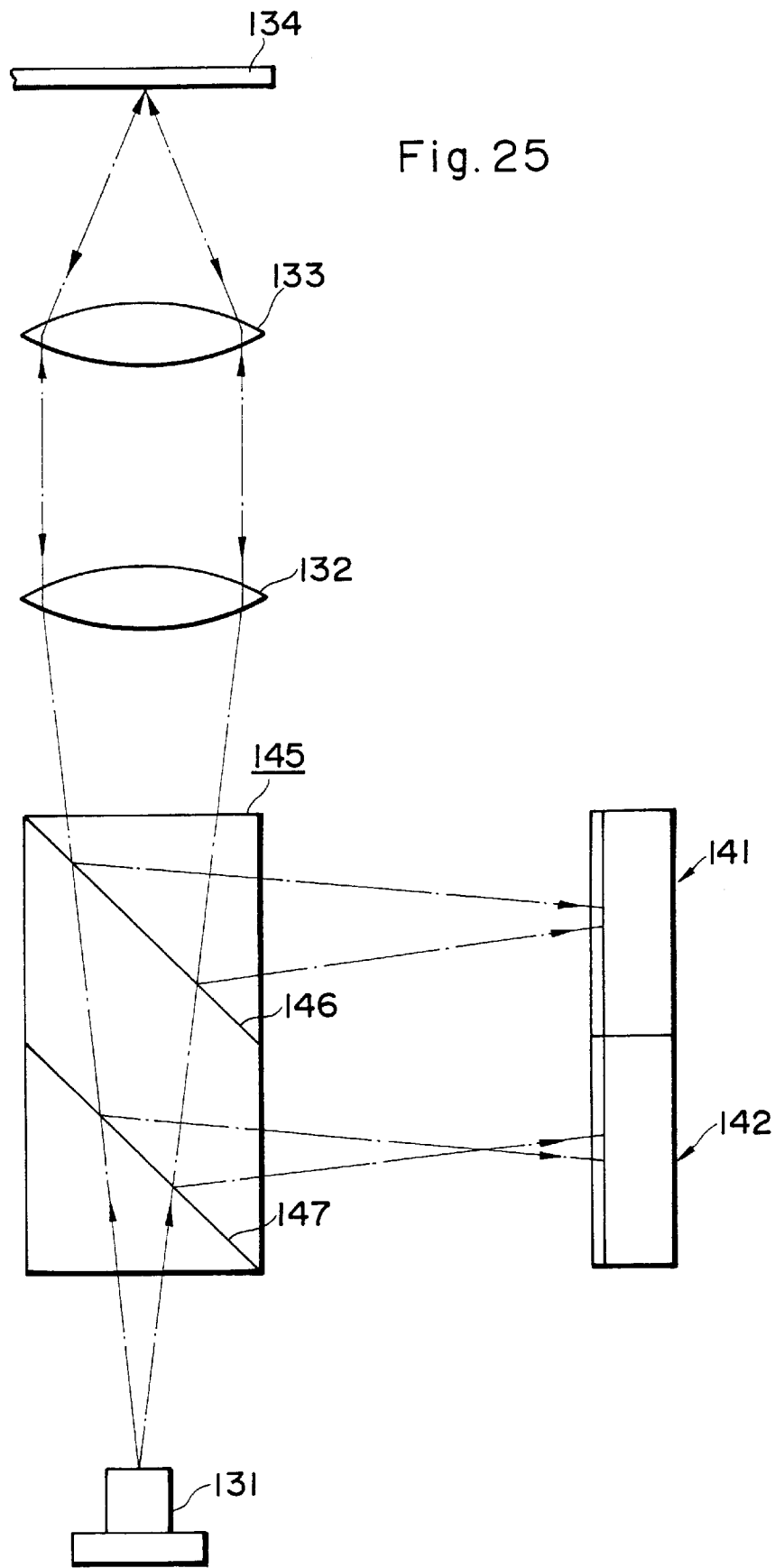
FIG. 25 is a diagram showing the structure of an optical system adopted in an optical pickup head of an information recording and reproducing apparatus for a magnetooptical disk in a fifth embodiment according to the present invention.

FIG. 25 shows the structure of an optical head employed in an information recording and reproducing apparatus for a magnetooptical disk in a fifth embodiment according to the present invention. In this diagram, the same elements and constituent components as those of FIGS. 23, 24a, and 24b are assigned with the same reference numerals.

Between a semiconductor laser 131 and a collimation lens 132, there is arranged a composite beam splitter 145 having two reflection surfaces 146 and 147. These surfaces are separatedly disposed along a direction of an optical axis of the semiconductor laser 131 with an appropriate distance therebetween for the following purpose. Namely, with the provision above, it is possible to arranged in the optical axis direction a photosensor 141 located on a front side of a focal point of a converged light which has been reflected from a magnetooptical disk 134 and then from the reflection surface 146 and a photosensor 142 located on a rear side of a focal point of a converged light which has been reflected from a magnetooptical disk 134 and thereafter from the reflection surface 147. Naturally, when necessary, the positions respectively of the photosensors 141 and 142 may be shifted in a direction orthogonal to the optical axis direction.

Of the reflection light from the magnetooptical disk 134, only a light which has passed through the reflection surface 146 and which has reflected from the reflection surface 147 is received by the photosensor 142. In order to substantially equalize to each other the quantities of lights to be respectively received by the photosensors 141 and 142, the light reflection efficiency (e.g. 9%) of the reflection surface 146 is set to be slightly smaller than that (e.g. 10%) of the reflection surface 147. The reflection efficiency of each surface above is almost compeltely independent of the polarization of light. The composite beam splitter 145 having the reflection surfaces 146 and 147 can be constituted with a combination of dielectric blocks each having reflection surfaces equivalent to the surfaces 146 and 147.

In the optical pickup head above, an information readout signal, a focusing error signal, and a tracking error signal can be created in a similar manner described in conjunction with the fourth embodiment.

Moreover, when an optical disk or the like is employed as the optical-recording medium, it is natural that the analyzers need riot be disposed in the photosensors 141 and 142.

Figure 26:
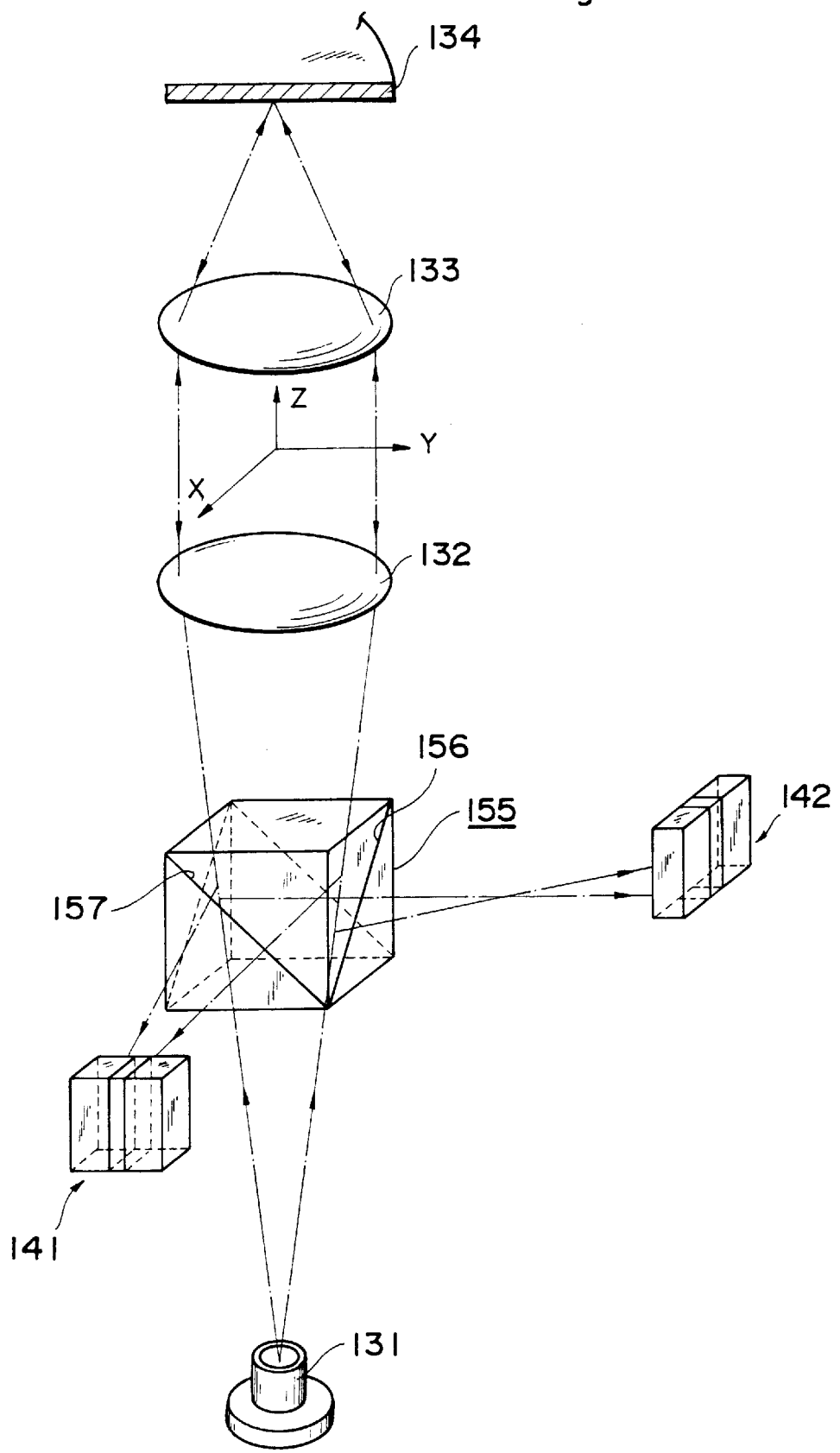
FIG. 26 is a schematic diagram showing the construction of an optical system adopted in an optical pickup head of an information recording and reproducing apparatus for a magnetooptical disk in a sixth embodiment according to the present invention.

FIG. 26 shows the configuration of an optical head of an information recording and reproducing apparatus for a magnetooptical disk in a sixth embodiment according to the present invention. In this constitution, the same constituent elements as that shown in FIG. 23 are assigned with the same reference numerals and a redundant description thereof will be avoided.

Figure 27:
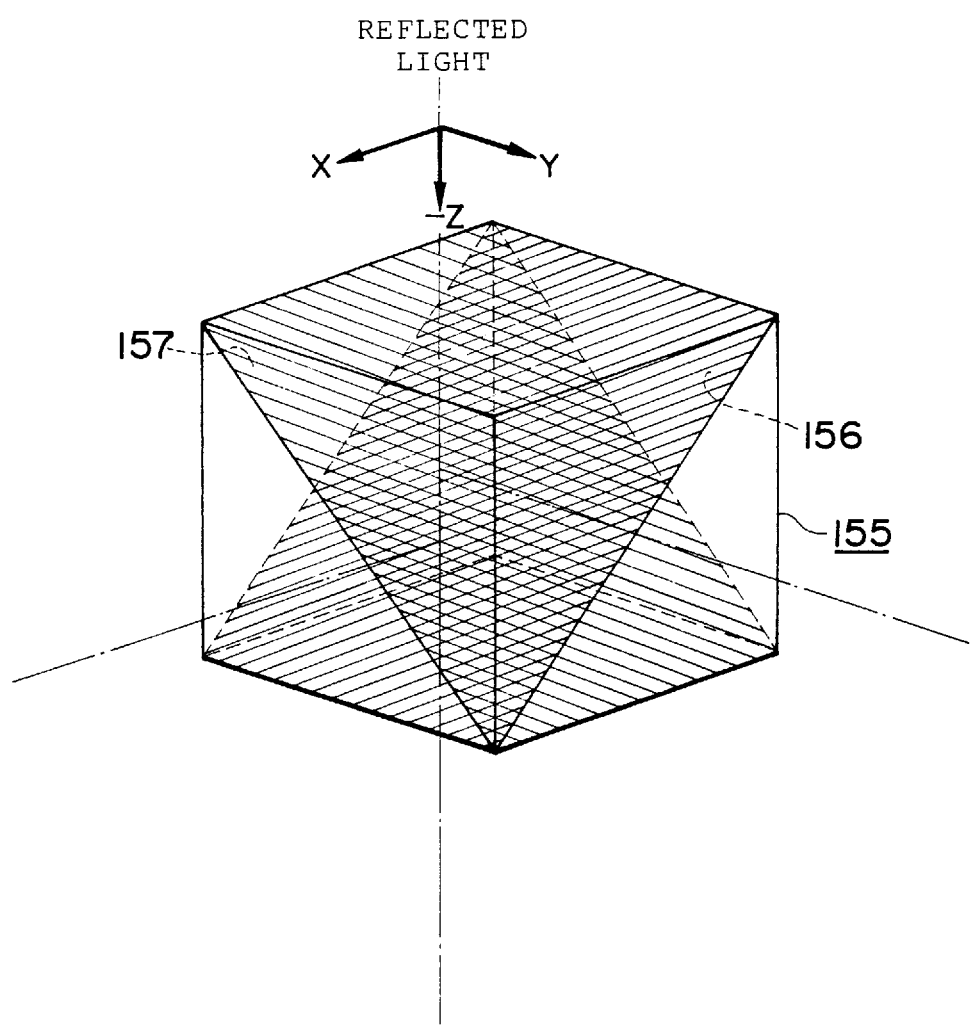
FIG. 27 is a magnified perspective view showing a composite polarization beam splitter utilized in the optical system of the sixth embodiment.

Between a semiconductor laser 131 and a collimation lens 132, there is disposed a composite polarization beam splitter 155 including polarizing reflection surfaces 156 and 157. FIG. 27 shows a magnified view of the structure of the composite polarization beam splitter 155 in which the two polarizing reflection surfaces 156 and 157 are indicated as hatching portions.

In this diagram, let us assume that the reflection light from a magnetooptical disk 134 is incident to the composite polarizing beam splitter 155 in a direction denoted as -Z direction. As shown here, two directions orthogonal to the Z direction are assumed to be designated as X and Y directions, respectively. The polarizing reflection surface 156 is inclined by 45° relative to each of the X and Z directions; whereas, the polarizing reflection surface 157 is skewed by 45° relative to each of the Y and Z directions. In consequence, these surfaces 156 and 157 are disposed to be orthogonal to each other.

Each of the polarizing reflection surfaces 156 and 157 is configured such that the reflection efficiency of an S-polarized light component (with a polarization direction parallel to the reflection surface) is set to an appropriate value not more than 100% and the transmission efficiency of a P-polarized light component is substantially 100%. In consequence, the two orthogonal polarized light components of the reflection light from the magnetooptical disk 134 are reflected respectively by the polarizing reflection surfaces 156 and 157 to be received by the photosensors 141 and 142 respectively associated therewith. In this connection, the photosensors 141 and 142 need not be necessarily provided with the analyzers; however, there may be adopted an analyzer for passing therethrough the polarization direction component of the incident light.

The composite beam splitter 155 above can be constructed by combining four blocks with each other, each block having polarizing reflection surfaces coated with polarizing films, respectively.

The polarization direction of the semiconductor laser 131 is inclined by 45° with respect to each of the two orthogonal polarization directions associated with the light polarization and separation conducted by the composite polarizing beam splitter 155.

Also in this configuration, a readout signal, a focusing error signal, and a tracking error signals are obtained in the same fashion as for the embodiments above.

Figure 28:
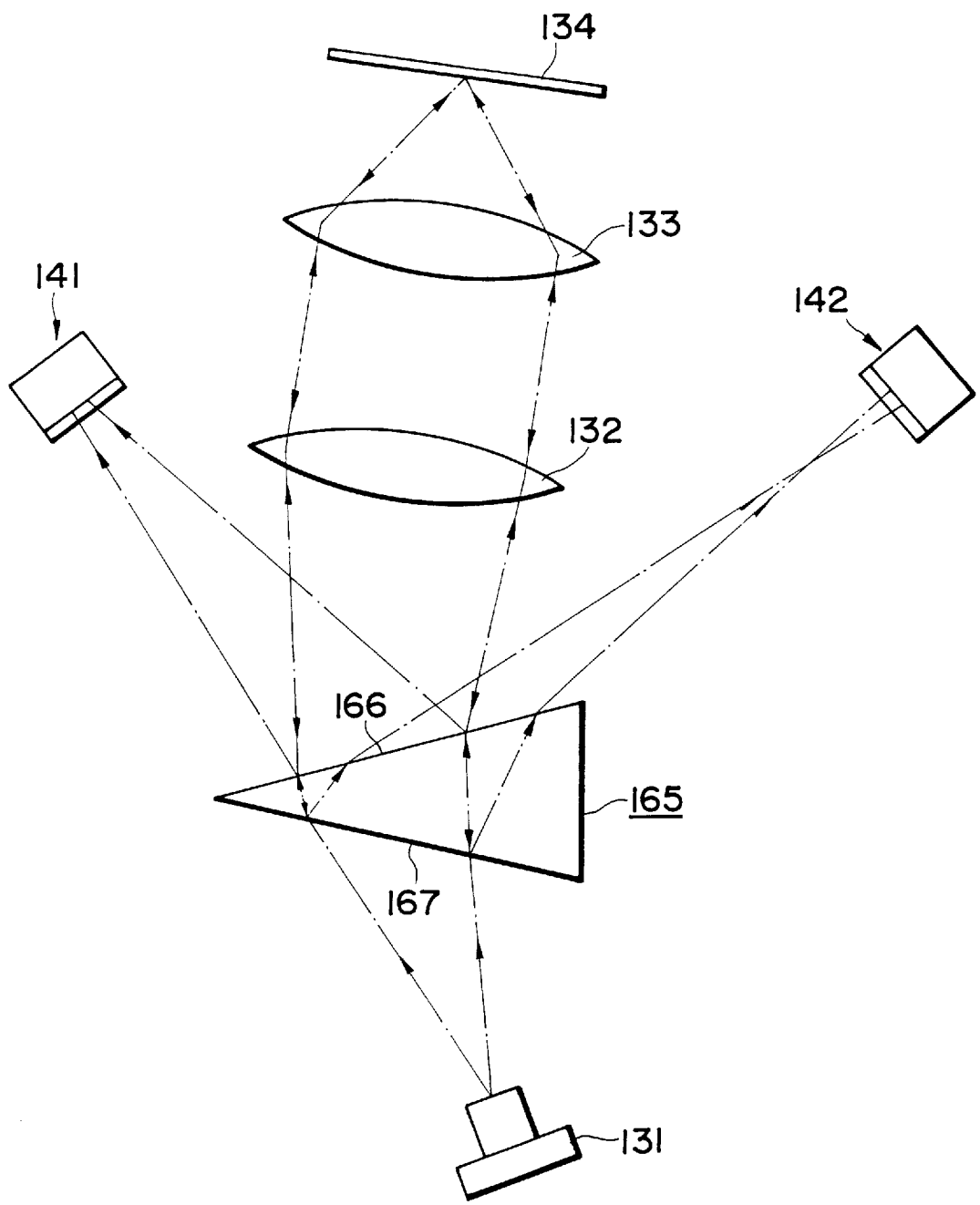
FIG. 28 is a diagram showing the constitution of an optical system employed in an optical pickup head of an information recording and reproducing apparatus for a magnetooptical disk in a seventh embodmimnt according to the present invention.
Figure 29:
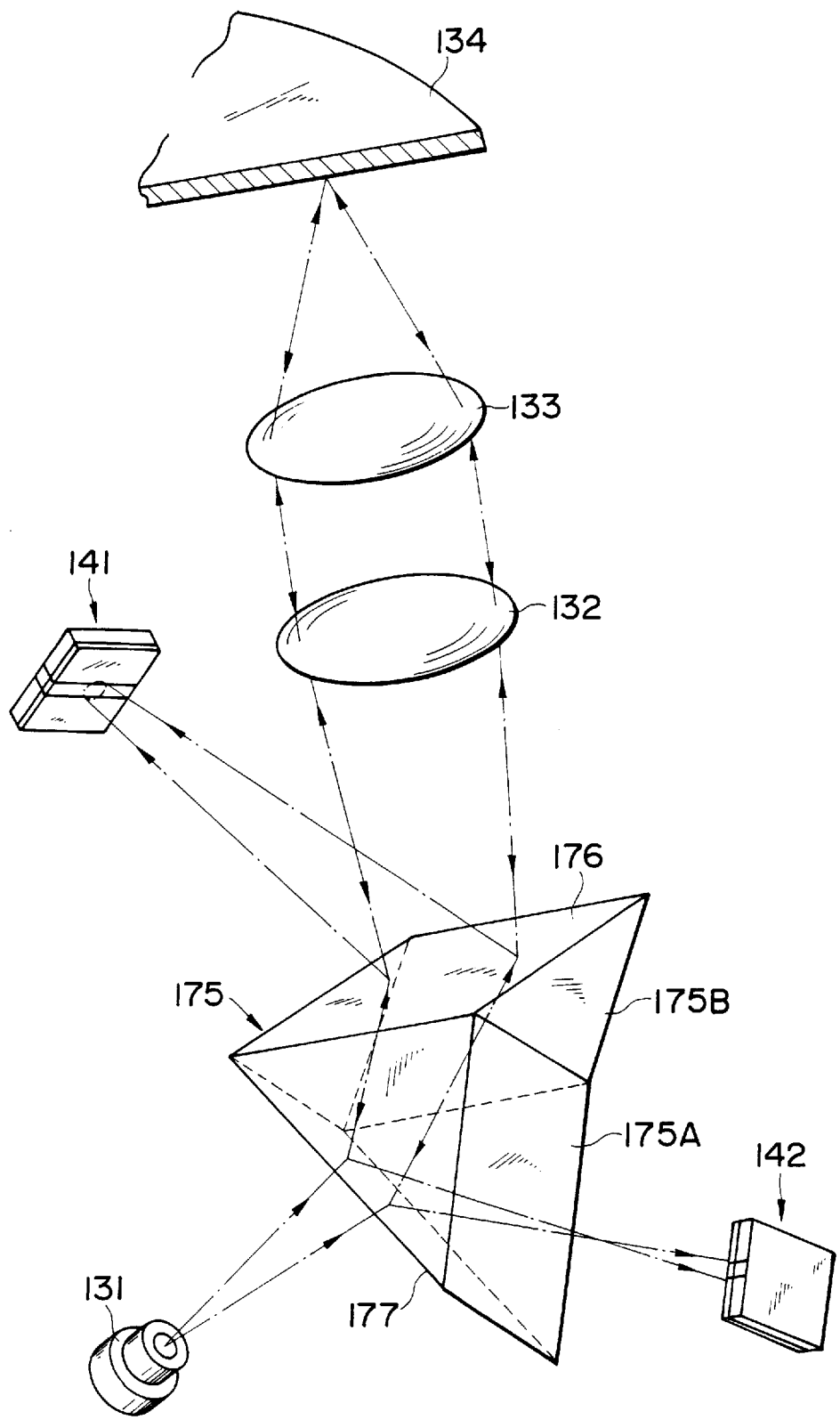
FIG. 29 is a diagram showing the configuration of an optical system used in an optical pickup head of an information recording and reproducing apparatus for a magnetooptical disk in an eighth embodiment according to the present invention.

FIG. 28 shows the constitution of an optical pickup head of an information recording and reproducing apparatus for a magnetooptical disk in a seventh embodiment according to the present invention. In the structure of this embodiment, the same constituent elements as those of the embodiments above are assigned with the same reference numerals.

The optical head comprises a semiconductor laser 131 and a converging optical system for focusing onto a surface of a magnetooptical disk 134 a divergent light generated from the semiconductor laser 131. The focusing optical system includes a collimation lens 132 for collimating the diverging light and an objective 133 for converging the collimated light.

The configuration includes a prism 165 in an optical path of the divergent light between the semiconductor laser 131 and the collimation lens 132. The prism 165 is of a type easily found on the market and has two surfaces 166 and 167 each coated with a reflection film. Lights reflected from the reflection surfaces (first and second reflection surfaces) 166 and 167 are received by photosensors 141 and 142, respectively. It is favorable to set the reflection efficiency of each of these reflection surfaces such that for an incident light thereto, substantially an identical quantity of light is reflected therefrom. The reflection efficiency of each reflection surface does not depend on the polarization of light.

A divergent light created from the semiconductor laser 131 is refracted once by each of the two surfaces 166 and 167 of the prism 165 to be converged through the focusing optical system onto a surface of the magnetooptical disk 134. A light reflected from the disk 134 is then focused by the focusing optical system. A portion of the converged reflection light is reflected by the first reflection surface 166 to be incident to the photosensor 141 disposed at a position on a front side of a focusing point of the correctly focused reflection light. Of the reflection light from the magnetooptical disk 134, a light which has passed through the first reflection surface 166 is transmitted via the prism 165 such that a portion of the transmitted light is reflected from the second reflection surface 167 to be received by the photosensor 142 located at a position on a rear side of a focal point of the properly focused reflection light.

The photosensors 141 and 142 are configured as shown in FIGS. 24a and 24b, respectively. Moreover, as described above, based on signals produced from the photosensors 141 and 142, a data readout signal, a focusing error signal, and a tracking error signal are attained in the same manner.

FIG. 29 and FIGS. 30a, 30b, and 30c show the configuration of an optical head of an information recording and reproducing apparatus for a magnetooptical disk in an eighth embodiment according to the present invention. Also in these diagrams, the same components as those shown in the above embodiments are assigned with the same reference numerals for simplification.

In the constitution, there is disposed a prism 175 having a considerably complex shape between a semiconductor laser 131 and a collimation lens 132.

For an easy understanding of the complicated shape of the prism 175, FIGS. 30a to 30c show a plan view, a front view, and a side view of the prism 175. Furthermore, these diagrams include light propagation directions in the prism 175 of a divergent light emitted from the semiconductor laser 131 and a reflection light from a magnetooptical disk 134, the directions being indicated with optical axes of the respective components. Points A and B respectively denote an incident point and an emission point and a reflection point associated with the divergent and reflection lights.

For simplification, let us consider that the prism 175 is constituted with two portions 175A and 175B. The portion 175A has a contour of a trigonal prism of which a surface facing the semiconductor laser 131 is assumed to be a second reflection surface 177. The portion 175B is a pentahedron having two lozenge-shaped surfaces, two triangular surface, and a rectangular surface. The portion 175B is brought into contact with the portion 175A on the rectangular surface of the portion 175B. One of the lozenge-shaped surfaces facing the magnetooptical disk 134 is assumed to be a first reflection surface 176. The reflection surfaces 176 and 177 are also constituted such that each thereof reflects substantially an identical quantity of the reflection light incident thereto so as to supply almost the same quantity of light to each of the photosensors 141 and 142. The reflection surfaces 176 and 177 develop functions almost completely independent of the polarization of light.

A diverging light illuminated from the semiconductor laser 131 enters the prism 175 from the second reflection surface 177 (point A) of the prism 175 to be refracted therein and is then emitted from the first surface 176 (point B) of the prism 175. The emission light from the prism 175 is converged onto a surface of the magnetooptical disk 134 by a focusing optical system comprising a collimation lens 132 and an objective 133. The light is then reflected on the optical disk 134 so that the reflection light is again converged by the focusing optical system. The reflection light, while being thus converged, is reflected on the first reflection surface 176 (point B) to be received by a photosensor 141 located at a position on a front side of a focusing position of the reflection light appropriately focused. Moreover, of the light reflected from the magnetooptical disk 134, a light which has passed through the first reflection surface 176 is transmitted through the prism 175 such that a portion thereof is reflected on the second reflection surface 177 (point A). The reflected light is delivered through the prism 175 to be emitted from a surface of the prism portion 175A so as to be incident to a photosensor 142 disposed at a position on a rear side of the focusing position.

In this optical pickup head, an information readout signal, a focusing error signal, and a tracking error signal are generated in the same manner as for the embodiments above.

In a case where an optical disk or the like is utilized as the optical recording medium, it is to be understood that the analyzers need not be disposed for the photosensors 141 and 142.

Figure 31:
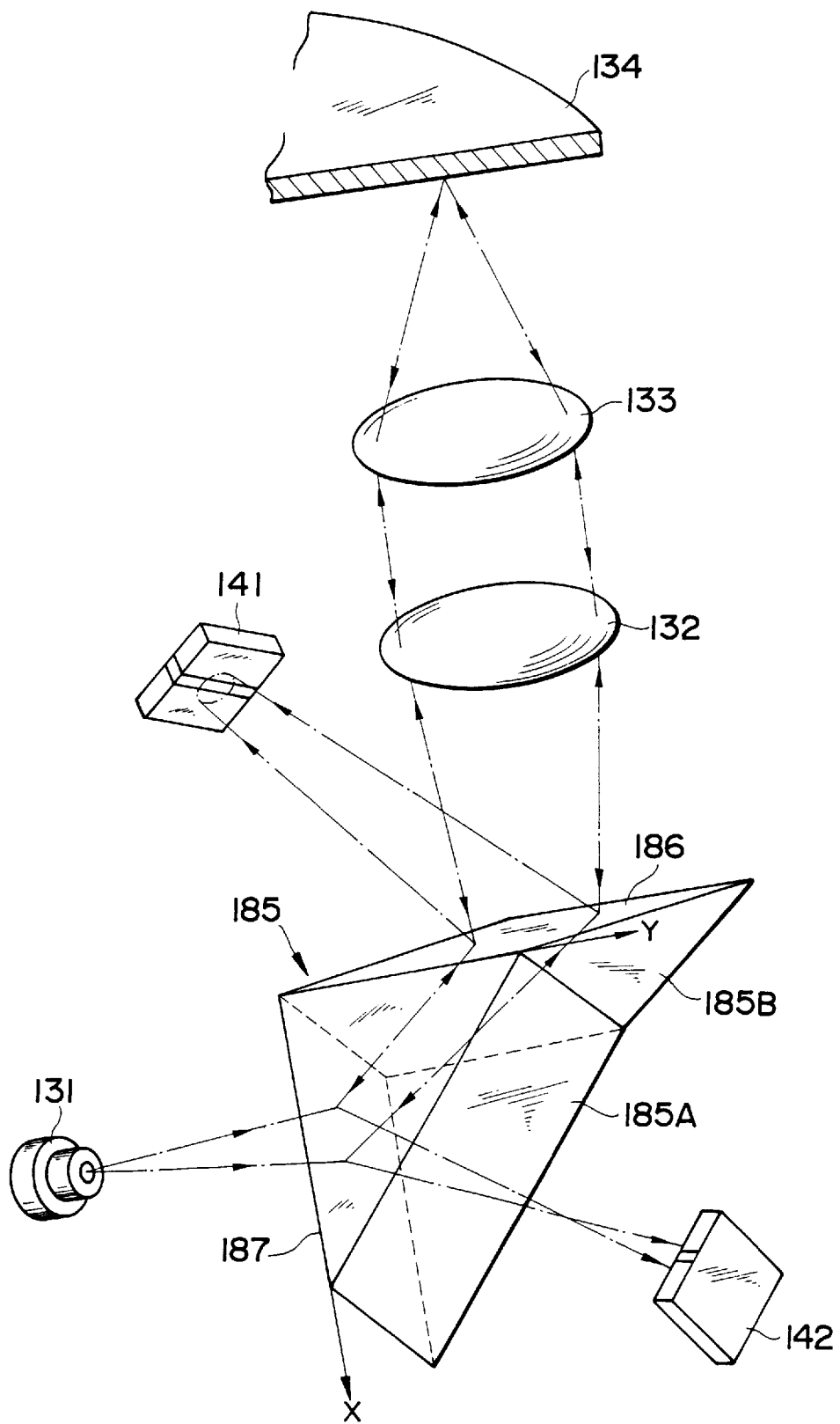
FIG. 31 is a perspective view illustratively showing the structure of an optical system used in an optical pickup head of an information recording and reproducing apparatus for a magnetooptical disk in a ninth embodiment according to the present invention.
Figure 32:
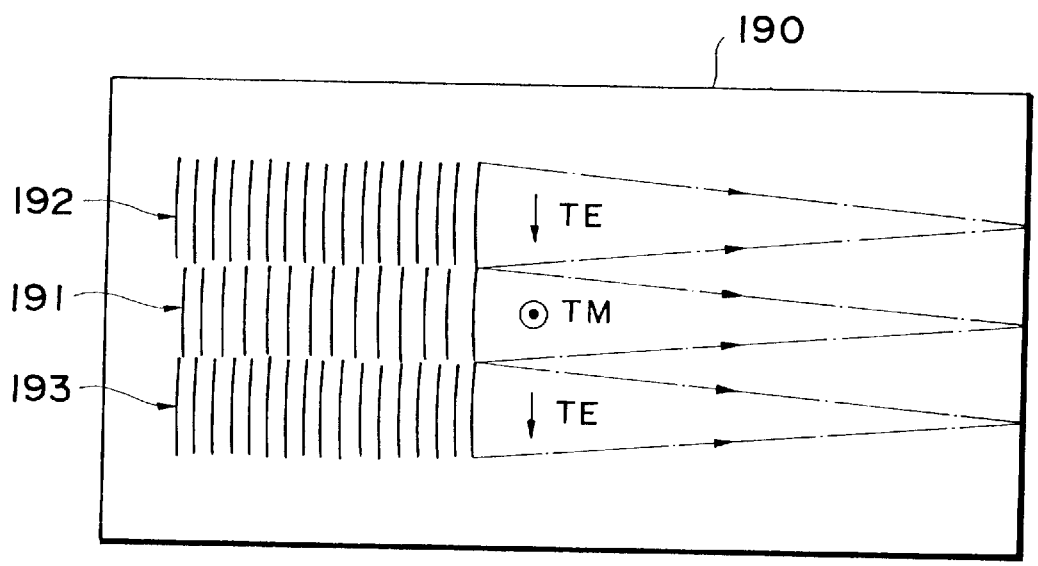
FIG. 32 is a plan view schematically showing a grating coupler adopted in a conventional optical pickup device.
Figure 33:
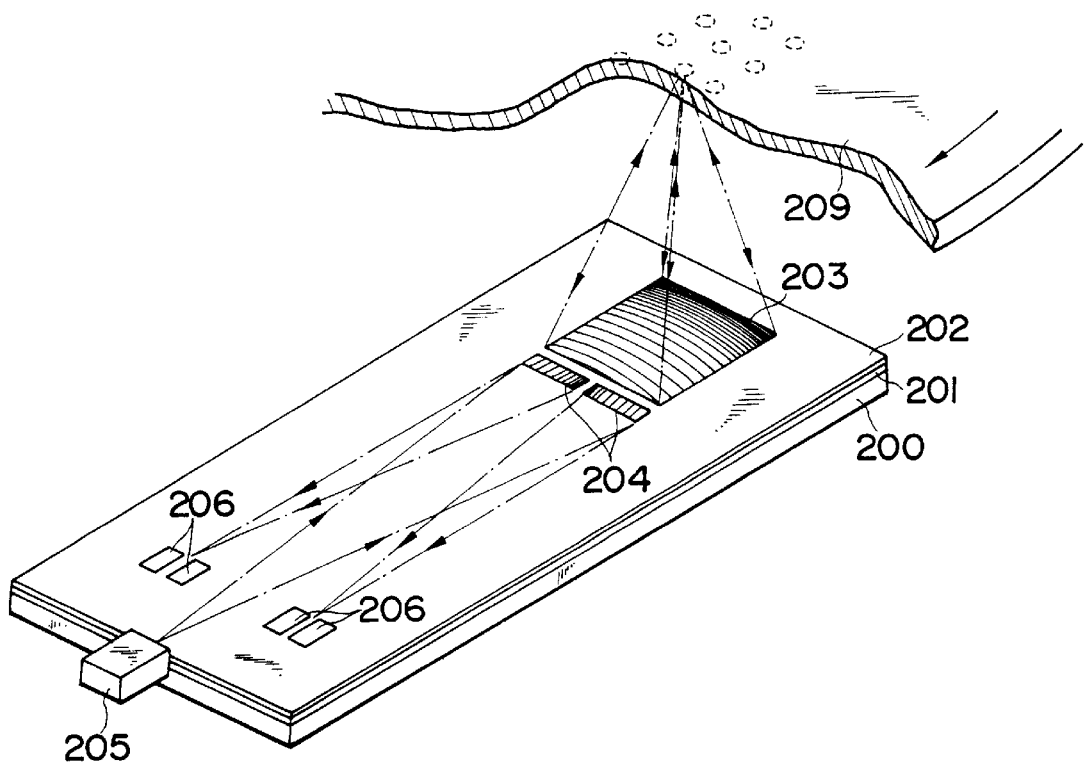
FIG. 33 is a perspective view showing an optical system of a conventional optical pickup device.

FIG. 31 shows the configuration of an optical pickup head of an information recording and reproducing apparatus for a magnetooptical disk in a ninth embodiment according to the present invention. In this diagram, the same components are similarly assigned with the same reference numerals and a duplicated description thereof will be avoided.

In the constitution, a prism 175 having two polarizing reflection surfaces 186 and 187 is adopted between a semiconductor laser 131 and a collimation lens 132. The polarizing prism 175 has a contour which is basically the same as; that of the prism 165 of FIG. 29. The prism 175 is constituted with portions 185A and 185B and is structurally different from the prism 175 of FIG. 29 in that a polarizing film is disposed on each of the polarizing reflection surfaces 186 and 187 respectively related to the reflection surfaces 176 and 177. Moreover, as can be seen from FIG. 31, a direction Y along the first polarizing reflection surface 186 is orthogonal to a direction X along the second polarizing reflection surface 187.

Each of the polarizing reflection surfaces 186 and 187 is constituted such that the reflection efficiency of an S-polarized light component (with a polarization direction parallel to the polarizing reflection surface) is set to an appropriate value not exceeding 100% and the transmission efficiency of a P-polarized light component is substantially 100%. Consequently, the two orthogonal polarized light components of the reflection light from the magnetooptical disk 134 are reflected respectively by the polarizing reflection surfaces 186 and 187 to enter the photosensors 141 and 142 respectively associated therewith. In this regard, the analyzers need not necessarily be disposed for the photosensors 141 and 142; however, there may be naturally adopted an analyzer for passing therethrough the polarization direction component of the incident light.

It is naturally to be understood that in order to substantially equalize to each other the reflection lights to be incident to the two photosensors 141 and 142, the reflection efficiency of the S-polarized component is favorably determined in advance for each of the polarizing reflection surfaces 186 and 187.

The polarization direction of the semiconductor laser 131 is skewed by 45° relative to each of the two orthogonal polarization directions related to the light polarization and separation accomplished by the polarizing prism 185.

In this configuration of the optical pickup head, a readout signal, a focusing error signal, and a tracking error signals are also produced in the same fashion as for the embodiments above.

As many apparently widely different embodiments of the present invention can be made without departing from the spirit and scope thereof, it is to be understood that the invention is not limited to the specific embodiments thereof except as defined in the appended claims.

What is claimed is:
1. An optical pickup device comprising:
   a light emitting element;
   a focusing optical system for converging a light irradiated from said light emitting element onto an optical recording medium and for focusing a reflection light from said optical recording medium;
   a composite beam splitter having two substantially mutually orthogonal reflection surfaces for passing therethrough at least a portion of the light emitted from said light emitting element and for reflecting a portion of the reflection light from the optical recording medium into two different directions; and
   two photosensors for respectively receiving two light beams reflected from said composite beam splitter.
2. An optical pickup device in accordance with claim 1 further including two analyzers respectively disposed on front sides of said photosensors, said analyzers respectively having polarization directions which are orthogonal to each other.

3. An optical pickup device in accordance with claim 1 wherein said composite beam splitter is disposed between said light emitting element and said focusing optical system.
4. An optical pickup device in accordance with claim 1 wherein:
   said focusing optical system includes a collimation lens and an objective; and
   said collimation lens is disposed between said objective and said composite beam splitter.
5. An optical pickup device comprising:
   a light emitting element;
   a focusing optical system for converging a light irradiated from said light emitting element onto an optical recording medium and for focusing a reflection light from the optical recording medium;
   a composite polarization beam splitter having two substantially mutually orthogonal polarization reflection surface for passing therethrough at least a portion of the light emitted from said light emitting element and for separating a portion of the reflection light from the optical recording medium into two polarized light components having polarization directions orthogonal to each other and for reflecting these polarized light components into two different directions; and
   two photosensors for respectively receiving two polarized light components thus separated by said composite polarization beam splitter.
6. An optical pickup device in accordance with claim 5 wherein said composite polarization beam splitter is disposed between said light emitting element and said focusing optical system.
7. An optical pickup device in accordance with claim 5 wherein:
   said focusing optical system includes a collimation lens and an objective; and
   said collimation lens is disposed between said objective and said composite polarization beam splitter.
8. An optical pickup device comprising:
   a light emitting element;
   a focusing optical system for converging a light irradiated from said light emitting element onto an optical recording medium and for focusing a reflection light from the optical recording medium;
   a prism having two substantially mutually orthogonal polarization reflection surfaces for passing therethrough the light emitted from said light emitting element and for separating a portion of the reflection light from the optical recording medium into polarized components respectively having polarization directions which are orthogonal to each other, thereby reflecting the polarized light components into two different directions; and
   two photosensors for respectively receiving two polarized light components thus separated by said prism.
9. An optical pickup device in accordance with claim 8 wherein said prism is disposed between said light emitting element and said light focusing optical system.
10. An optical pickup device in accordance with claim 8 wherein:
   said focusing optical system includes a collimation lens and an objective; and
   said collimation lens is located between said objective and said prism.

* * * * *